(12) United States Patent
Xu et al.

(10) Patent No.: US 8,903,525 B2
(45) Date of Patent: Dec. 2, 2014

(54) SOUND PROCESSING DEVICE, SOUND DATA SELECTING METHOD AND SOUND DATA SELECTING PROGRAM

(75) Inventors: Dezheng Xu, Tokyo (JP); Junichi Kosaka, Tokyo (JP); Kosei Yamashita, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 759 days.

(21) Appl. No.: 13/090,486

(22) Filed: Apr. 20, 2011

(65) Prior Publication Data
US 2012/0078398 A1 Mar. 29, 2012

Related U.S. Application Data

(60) Provisional application No. 61/387,160, filed on Sep. 28, 2010.

(51) Int. Cl.
| | | |
|---|---|---|
| G06F 17/00 | (2006.01) | |
| G06F 17/30 | (2006.01) | |
| H04S 7/00 | (2006.01) | |
| G11B 27/32 | (2006.01) | |
| G10H 1/00 | (2006.01) | |
| G11B 27/10 | (2006.01) | |
| H04S 3/00 | (2006.01) | |
| G11B 27/28 | (2006.01) | |
| G11B 27/34 | (2006.01) | |
| G10L 19/008 | (2013.01) | |

(52) U.S. Cl.
CPC ........ *G11B 27/105* (2013.01); *G10H 2210/305* (2013.01); *G06F 17/3074* (2013.01); *G10L 19/008* (2013.01); *H04S 7/30* (2013.01); *G11B 27/329* (2013.01); *G10H 1/0058* (2013.01); *G10H 2220/096* (2013.01); *H04S 2400/11* (2013.01); *G10H 2230/015* (2013.01); *H04S 2400/03* (2013.01); *H04S 3/008* (2013.01); *H04S 2420/01* (2013.01); *G11B 27/28* (2013.01); *G11B 27/34* (2013.01); *G10H 2240/121* (2013.01); *G10H 2240/075* (2013.01); *G10H 2250/035* (2013.01)
USPC ........................................................ 700/94

(58) Field of Classification Search
USPC .................... 700/94; 381/119; 704/500–504; 369/1–12
See application file for complete search history.

(56) References Cited

U.S. PATENT DOCUMENTS 6,011,851 A * 1/2000 Connor et al. .................. 381/17
6,453,281 B1 9/2002 Walters et al.
(Continued)

FOREIGN PATENT DOCUMENTS

CN 101051505 A 10/2007
CN 101361123 A 2/2009
(Continued)

OTHER PUBLICATIONS

U.S. Appl. No. 13/093,045, filed Apr. 25, 2011, Kosaka, et al.
(Continued)

*Primary Examiner* — Andrew C Flanders
(74) *Attorney, Agent, or Firm* — Oblon, Spivak, McClelland, Maier & Neustadt, L.L.P.

(57) ABSTRACT

An information processing apparatus that stores a plurality of pieces of audio data, displays information corresponding to each of the plurality of pieces of audio data, receives an input selecting at least one of the plurality of pieces of audio data, reproduces a first piece of the plurality of pieces of audio data, and initiates simultaneous reproduction of a second piece of the plurality of pieces of audio data based on an input received at the interface, processes the first and second pieces of the audio data such that the first and second pieces of the audio data are separately audible by the user, and outputs the processed first and second pieces of the audio data.

17 Claims, 24 Drawing Sheets

(56) References Cited

U.S. PATENT DOCUMENTS

| | | | |
|---|---|---|---|
| 6,727,830 | B2 | 4/2004 | Lui et al. |
| 2002/0054164 | A1 | 5/2002 | Uemura |
| 2002/0180622 | A1 | 12/2002 | Lui et al. |
| 2003/0018477 | A1* | 1/2003 | Hinde .......................... 704/273 |
| 2007/0021961 | A1* | 1/2007 | Oh ................................ 704/273 |
| 2007/0233714 | A1 | 10/2007 | Tsuchiya |
| 2008/0269930 | A1* | 10/2008 | Yamashita et al. ............. 700/94 |
| 2009/0119589 | A1 | 5/2009 | Rowell et al. |
| 2009/0132921 | A1 | 5/2009 | Hwangbo et al. |
| 2010/0222904 | A1 | 9/2010 | Yamashita et al. |
| 2011/0153043 | A1* | 6/2011 | Ojala .............................. 700/94 |
| 2011/0153044 | A1* | 6/2011 | Lindahl et al. ................. 700/94 |
| 2011/0208331 | A1* | 8/2011 | Sandler et al. ................. 700/94 |

FOREIGN PATENT DOCUMENTS

| | | |
|---|---|---|
| CN | 101361124 A | 2/2009 |
| CN | 101583919 A | 11/2009 |
| DE | 199 04 007 A1 | 8/2000 |
| EP | 1 186 987 A2 | 3/2002 |
| EP | 1 843 349 A1 | 10/2007 |
| EP | 2 088 589 A1 | 8/2009 |
| EP | 2 088 590 A1 | 8/2009 |
| JP | 2008-135891 | 6/2008 |
| JP | 2008-135892 | 6/2008 |

OTHER PUBLICATIONS

Extended European Search Report issued Dec. 21, 2011 in patent application No. 11168575.6.

Apple, "iPod Touch User Guide—For iPhone OS 3.0 Software", retrieved from the Internet: http://manuals.info.apple.com/en_US/iPod_touch_3.0_User_Guide.pdf, XP55014037, Dec. 31, 2009, pp. 1-153.

Sony Corporation, "Quick Start Guide NWZ-X1050/X1051/X1060/X1061", retrieved from the internet http://support.sony-asia.com.edgesuite.net/consumer/IM/4137988111.pdf, XP55014083, Mar. 13, 2009, pp. 1-31.

Sony Corporation, "Sony Walkman Operation Guide NWZ-X1050/X1051/X1060/X1061", retrieved from the internet: http://support.sony-asia.com.edgesuite.net/consumer/IM/4141609121.pdf, XP55014085, Apr. 24, 2009, pp. 1-182.

Samsung, "Samsung YP-P2 MP3 Player user manual", retrieved from the internet:http://downloadcenter.samsung.com/content/UM/200902/20090205154425203/YPP2J-EUROPE-ENGLISH4.0.pdf, XP55014089, Feb. 26, 2009, 142 pages.

Combined Office Action and Search Report issued Dec. 4, 2013 in Chinese Patent Application No. 201110196114.4 (with English translation).

Notification of the Second Office Action issued Jul. 28, 2014 in Chinese Application No. 201110196114.4, with English translation, 15 pages.

\* cited by examiner

SOUND PROCESSING DEVICE, SOUND DATA SELECTING METHOD AND SOUND DATA SELECTING PROGRAM

CROSS REFERENCE TO RELATED APPLICATION

The present application claims the benefit of the earlier filing date of U.S. Provisional Patent Application Ser. No. 61/387,160 filed on Sep. 28, 2010, the entire contents of which is incorporated herein by reference.

BACKGROUND OF THE DISCLOSURE

1. Field of the Disclosure

The present disclosure relates to a sound data processing and, more particularly, to a sound processing device for selecting sound data and a user interface thereof.

2. Description of the Related Art

As a result of the development of an information processing technology in recent years, a large amount of content is readily held in a storage medium. As content held in the storage medium, for example, music content is generally downloaded from a distribution site through a network or is copied between devices so as to be held in the storage medium. A user who uses such content searches for desired content from a large amount of content. As a method therefor, desired content is generally searched for and selected from a list or a folder configuration of content names, images, videos or the like is displayed. That is, the user selects desired content based on content information obtained visually.

With respect to sound data such as music content reproduced so as to be acoustically recognized, the reproduced result may be enjoyed regardless of the display on a screen.

In Japanese Unexamined Patent Application Publication Nos. 2008-135891 and 2008-135892, the technology for simultaneously reproducing a plurality of pieces of music data and, at this time, performing a predetermined process with respect to the plurality of sound signals such that the music signals are heard by the sense of hearing so as to be separately audible by the user is disclosed.

SUMMARY OF THE DISCLOSURE

However, while certain music data is reproduced (listened to), it may be desired to select other music data. For example, the user may wish to create a playlist including only favorite music data as a set of reproduction groups (may wish to add new music data to a playlist) or may wish to listen to (search for) the designated music data for trial listening.

In this case, in general, a list of music data or the like is displayed on a display screen and the desired music data is designated based on visual information.

However, in general, the user does not wholly recognize acoustic content of a plurality of pieces of music data to be retrieved and may not guess simply from the visual information which acoustic content is included in the music data to be retrieved. In addition, even in familiar music data, retrieval is facilitated if the content is acoustically checked.

In order to obtain acoustic information even with respect to other music data while certain music data is being reproduced, it is necessary to actually reproduce and listen to the other music data. In the related art, the music data which is currently being listened to pauses and the other music data is reproduced or, if possible, a plurality of pieces of music data is simultaneously reproduced.

If the music data which is currently being listened to pauses, even when the original music data is reproduced again, several operational steps are generally performed in order to retrieve the music data and thus efficiency deteriorates.

In addition, if selection is performed plural times, the pausing and reproducing operations of the music data are sequentially repeated one by one and thus efficiency similarly deteriorates.

If a plurality of pieces of music data is simultaneously reproduced, in particular, if a plurality of pieces of music data such as a musical composition including broadband sound signal overlaps, it is difficult to distinguish each of the music data.

It is desirable to provide a sound processing device, a sound data selecting method and a sound data selecting program, which efficiently retrieve sound data using a technology of separating a plurality of pieces of sound data so as to be simultaneously audible to the sense of hearing.

According to an embodiment of the present disclosure, there is provided an information processing apparatus that stores a plurality of pieces of audio data, displays information corresponding to each of the plurality of pieces of audio data, receives an input selecting at least one of the plurality of pieces of audio data, reproduces a first piece of the plurality of pieces of audio data, and initiates simultaneous reproduction of a second piece of the plurality of pieces of audio data based on an input received at the interface, processes the first and second pieces of the audio data such that the first and second pieces of the audio data are separately audible by the user, and outputs the processed first and second pieces of the audio data.

According to the present disclosure, while sound data is reproduced it is possible to receive designation of another sound data and to efficiently select sound data while both music data are simultaneously reproduced while being separated and heard, without stopping the reproduction thereof.

DESCRIPTION OF THE PREFERRED EMBODIMENTS

Hereinafter, the embodiments of the present disclosure will be described in detail with reference to the accompanying drawings.

Figure 1:
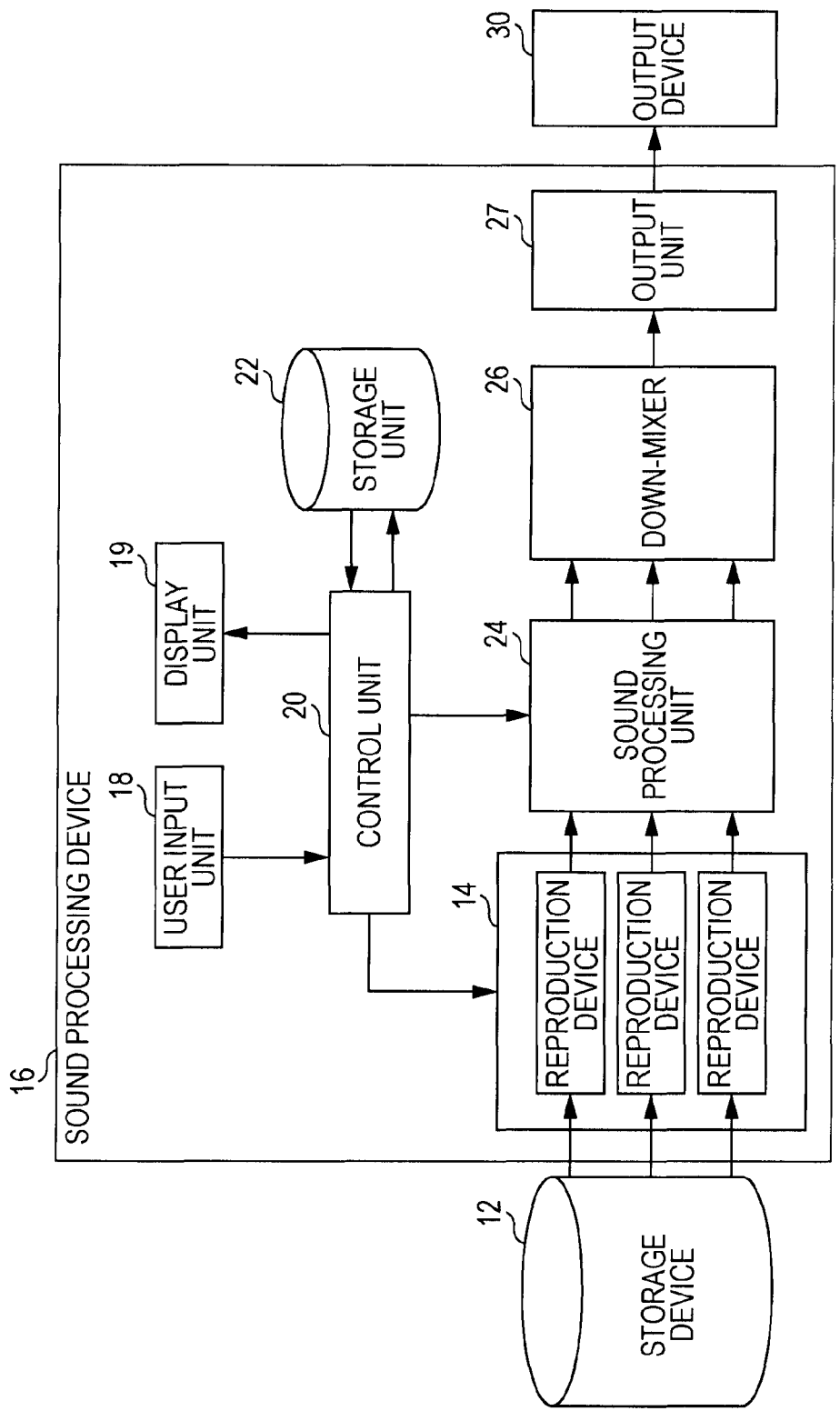
FIG. 1 is a block diagram showing the overall structure of a sound processing system including a sound processing device according to an embodiment of the present disclosure.

FIG. 1 is a block diagram showing the overall structure of a sound processing system including a sound processing device according to the present embodiment.

This sound processing system provides an interface for allowing a user to select any one of a plurality of pieces of sound data stored in a storage device or a recording medium. To this end, display information such as character information or image information corresponding to each piece of sound data is displayed on a screen as a list, and the user is allowed to select the stored sound data while listening to the content of the plurality of pieces of sound data, that is, the sound itself or to check all the sound data.

In the present embodiment, after one piece of the plurality of pieces of sound data begins to be reproduced by an input operation of the user obtained from a user interface, the other sound data is simultaneously reproduced without stopping the reproduction of the sound data due to a user operation from a user input unit. At this time, with respect to the first sound data which begins to be reproduced first and the second sound data which begins to be reproduced subsequently, a specific process of allowing the user to separate and acoustically listen to both of the sound data is executed. Such a process is referred to as a sound separation process for separate listening in the present specification.

In more detail, in the sound separation process, the plurality of pieces of input sound data is simultaneously reproduced and a specific filter process is applied to the plurality of reproduced sound signals. Next, such sound signals are mixed to output sound data having a desired channel number so as to be acoustically output from an output device such as a stereo or earphone. Similarly to a general reproduction device, only a single number of pieces of input sound data may be reproduced and output from the output device.

In the present specification, music data is used as an example of sound data. However, the sound data of the present disclosure is not limited to music data and may be applied to data representing any sound such as a reading voice, comic storytelling, meetings or the like, environmental sounds, speech sounds, or the ringtones (melody) of a telephone, a of television broadcast or the like, or sound data included in image data recorded on a DVD.

The sound processing system 10 shown in FIG. 1, broadly speaking, largely includes a storage device 12 for storing a plurality of pieces of music data, a sound processing device 16 for reading the music data from the storage device 12 and reproducing the music data as a sound signal, and an output device 30 for outputting the sound signal as sound.

The storage device 12 may include a storage device mounted in an apparatus, such as a hard disk, and a small-sized storage medium which is detachably mounted in an apparatus, such as a flash memory. The storage device 12 may include a storage device such as a hard disk in a server connected to the sound processing device 16 through a network.

The sound processing device 16 includes a plurality of reproduction devices 14, a user input unit 18, a display unit 19, a control unit 20, a storage unit 22, a sound processing unit 24, a down-mixer 26, and an output unit 27.

The reproduction devices 14 reproduce and output music data (in the present example, a song) selected by the user as a sound signal, and appropriately decode one selected from the music data stored in the storage device 12 so as to generate the sound signal. Although three pieces of music data are simultaneously reproduced and three reproduction devices 14 are shown in FIG. 1, the number of reproduction devices is not limited. In addition, if a reproducing process is performed in parallel by a multi-processor or the like, from the standpoint of appearance, one reproduction device 14 including a plurality of processing units, each of which reproduces each piece of music data and generates each sound signal, may be used.

The user input unit 18 allows the user to input an instruction, in the present embodiment, has an input area overlapped on a display screen of the display unit 19, and includes a touch panel (touch screen) for detecting a position touched by the user.

The display unit 19 displays characters or images on the display screen and includes a display device such as an LCD or an organic EL and a display controller.

The control unit 20 performs the conversion of the display of the display unit 19 according to an instruction input from the user, the conversion of the music data reproduced by the reproduction device 14 according to an input instruction from the user, the control of the operation of the reproduction device 14 or the sound processing unit 24 according to an instruction from the user, or the like, and includes a CPU or the like. The control unit 20 has a function for executing a characteristic process in the present embodiment. That is, in a state in which first sound data is independently reproduced, when a second operation different from a first operation for instructing the start of the reproduction of the sound data by the input unit is performed with respect to second sound data, the control unit has a function for processing the first sound data and the second sound data by the sound processing unit 24 and outputting output sound data, in which the first and second sound data are mixed, from the output unit 27.

The storage unit 22 includes a storage medium, such as a memory or a hard disk, for storing music data, information corresponding to each piece of music data, image data, a variety of control data, or the like. The storage unit 22 also stores a table necessary for control by the control unit 20, that is, information such as predetermined parameters.

The sound processing unit 24 performs a predetermined process with respect to a plurality of pieces of input sound data such that the plurality of pieces of input sound data is heard by the sense of hearing so as to be separately audible by the user. In more detail, a predetermined filter process is performed with respect to each of the plurality of pieces of input sound data so as to generate a plurality of sound signals (output sound data) capable of being heard by the sense of hearing so as to be separately recognized. An emphasis level may be reflected to each piece of music data. The details of the operation of the sound processing unit 24 will be described later.

The down-mixer 26 mixes the plurality of sound signals subjected to the filter process so as to generate an output signal having a desired number of channels.

The output unit 27 includes a D/A converter for converting digital sound data into an analog sound signal, an amplifier for amplifying the output signal, an output terminal, and the like.

The output device 30 includes an electrical acoustic conversion unit for outputting acoustically the mixed sound signal and, in detail, includes an (internal or external) speaker, a headphone, and an earphone. In the present specification, the term "speaker" is not limited to the speaker and may be any electrical acoustic conversion unit.

The sound processing system 10 corresponds to a personal computer, a music reproduction apparatus such as a mobile player, or the like. This system may be integrally configured or may be configured using a local connection of a plurality of units.

In addition, the format of the music data stored in the storage device 12 is not regarded as important. The music data may be encoded by a general encoding method such as MP3. In addition, in the following description, the music data stored in the storage device 12 is data of one song and an instruction input and process of the song unit are performed. However, the music data may be a set of a plurality of songs, such as an album.

The down-mixer 26 mixes the plurality of input sound signals after performing various adjustments as necessary and outputs as an output signal having a predetermined channel number, such as monaural, stereo or 5.1 channel. The channel number may be fixed or may be switched by the user using hardware or software.

In the information about the music data stored in the storage unit 22, any general information such as a song title, an artist name, an icon or a genre of song corresponding to music data may be included. Further, some of the parameters necessary for the sound processing unit 24 may be included. The information about the music data may be read and stored in the storage unit 22 when the music data is stored in the storage device 12. Alternatively, the information may be read from the storage device 12 and stored in the storage unit 22 whenever the sound processing device 16 is operated.

Now, the sound separation process of allowing one user to separate and listen to a plurality of pieces of music data, which is simultaneously reproduced, will be described.

If a plurality of sounds is mixed and heard using a set of speakers or earphones, fundamentally, since separation information at an inner ear level is not obtained, different sounds are recognized by the brain depending on differences in the auditory stream or tone, or the like. However, the sounds distinguishable through such an operation are restricted. Accordingly, it is difficult to apply this operation to various sounds.

If the methods proposed by Japanese Unexamined Patent Application Publication Nos. 2008-135891 and 2008-135892 are used, separation information approaching the inner ear or the brain is artificially added to sound signals so as to finally generate sound signals capable of being separated and recognized even when mixed.

That is, if the sound processing unit 24 is configured as follows, it is possible to separate and listen to a plurality of pieces of sound data.

In the sound separation process, a filter process is performed with respect to each sound signal so as to separate and listen to the music data when the plurality of pieces of music data is simultaneously reproduced, mixed and output. In detail, separation information at the inner ear level is provided by distributing a frequency band or time to the sound signal obtained by reproducing each piece of music data or separation information at the brain level by providing periodic change, performing an acoustic processing treatment or providing different localization with respect to some or all of the sound signals. To this end, when the sound signals are mixed, it is possible to acquire the separation information at both the inner ear level and the brain level and, finally, to facilitate the separation and recognition of the plurality of pieces sound data. As a result, it is possible to simultaneously observe sounds similarly to the viewing of a thumbnail display on a display screen and to readily check a plurality of music contents without spending much time even when wishing to check the contents.

In addition, the emphasis level of each sound signal may be changed. In detail, the frequency band allocated by the emphasis level may be increased, the method of performing the filter process may be made strong and weak, or the performed filter process may be changed. Accordingly, it is possible to make a sound signal having a high emphasis level more conspicuous than the other sound signals. The frequency band allocated to a sound signal having a low emphasis level is not used in order that the sound signal having the low emphasis level is not eliminated. As a result, it is possible to make a sound signal to be focused noticeably so as to narrow a focal point while listening to each of the plurality of sound signals.

Figure 2:
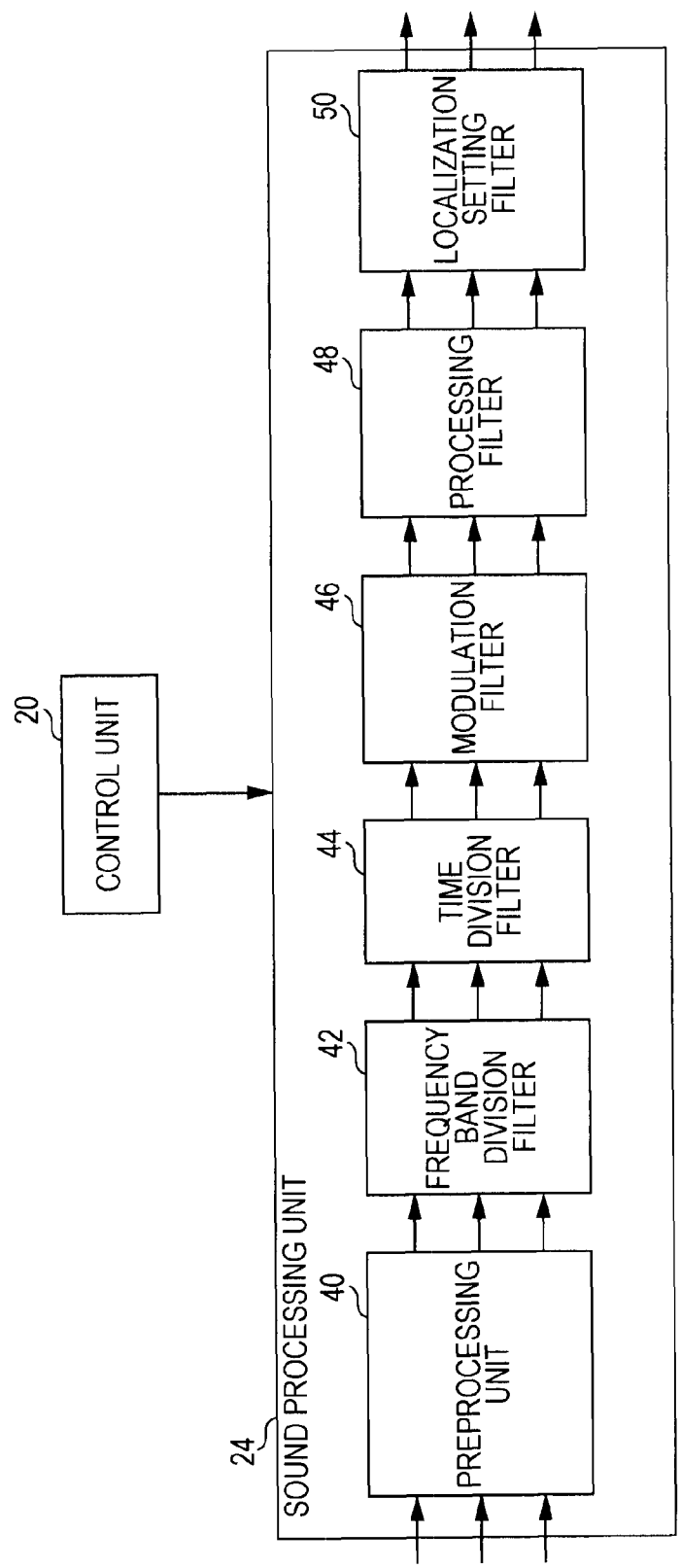
FIG. 2 is a block diagram showing a configuration example of a sound processing unit shown in FIG. 1.

The sound processing unit 24 of the sound processing device 16 of the present embodiment processes each of the sound signals so as to be heard by the sense of hearing and to be separately recognized when mixed. FIG. 2 shows the configuration example of the sound processing unit 24. The sound processing unit 24 includes a preprocessing unit 40, a frequency band division filter 42, a time division filter 44, a modulation filter 46, a processing filter 48, and a localization setting filter 50. All such filters are not indispensable in the present disclosure and at least one of the filters may be used. A plurality of filters may be used according to the properties of the filters.

The preprocessing unit 40 may be a general automatic gain controller or the like and controls gain such that the volumes of the plurality of sound signals received from the reproduction device 14 become approximately uniform.

The frequency band division filter 42 allocates a block obtained by dividing the audible band to each sound signal and extracts a frequency component belonging to the block allocated from each sound signal. For example, the frequency band division filter 42 may extract the frequency component by configuring a band pass filter (not shown) provided in every block and in each channel of the sound signal. A division pattern for deciding the manner of dividing the block or an allocation pattern for deciding the manner of allocating the block to the sound signal may be changed by enabling the control unit 20 to control each band pass filter or the like so as to set the frequency band or to set the valid band pass filter.

The time division filter 44 performs a time division method of the sound signal and time-modulates the amplitude of each sound signal by changing the phase in a period of several tens of milliseconds to several hundreds of milliseconds. The time division filter 44 is realized by, for example, controlling the gain controller on a time axis.

The modulation filter 46 performs a method of periodically providing a specific change to the sound signal and is realized by, for example, controlling the gain controller, an equalizer, a sound filter, or the like on a time axis.

The processing filter 48 performs a method of normally performing a special effect (hereinafter, referred to as a processing treatment) with respect to the sound signal and is realized by, for example, an effector, or the like.

The localization setting filter 50 performs a method for changing localization as the position of a virtual sound source and is realized by, for example, a three-dimensional localization process or the like of a panpot, a virtual surround or the like.

In the present embodiment, as described above, the plurality of mixed sound signals is heard by the sense of hearing so as to be separately recognized by the user. In addition, it is possible to emphasize and listen to any one of the sound signals. To this end, in the frequency band division filter 42 or the other filter, the process is changed according to the emphasis level requested by the user. Further, the filter passing the sound signal is also selected according to the emphasis level. In the latter case, a demultiplexer is connected to an output terminal of the sound signal of each filter. At this time, the selection and the non-selection of the next filter may be changed by setting presence or absence in the input of the next filter by a control signal from the control unit 20.

According to the sound separation process, it is possible to separate and distinguish the plurality of pieces of music data which is simultaneously output according to the separate listening method, by changing the parameter of each filter provided to the sound processing unit 24. The changed pattern of the provided parameter is stored in the storage unit 22 in advance. In addition, such a change pattern may be an internal parameter or a plurality of tables in the sound processing unit 24 in order to perform an optimal process.

As the separate listening method by the sound separation process, in more detail, there is a plurality of methods proposed as the related art as follows.

(1) Frequency Band Division Method

First, as the method of providing the separation information at the inner ear level, the division of the sound signal in the frequency band and the time division of the sound signal will be described.

Figure 3:
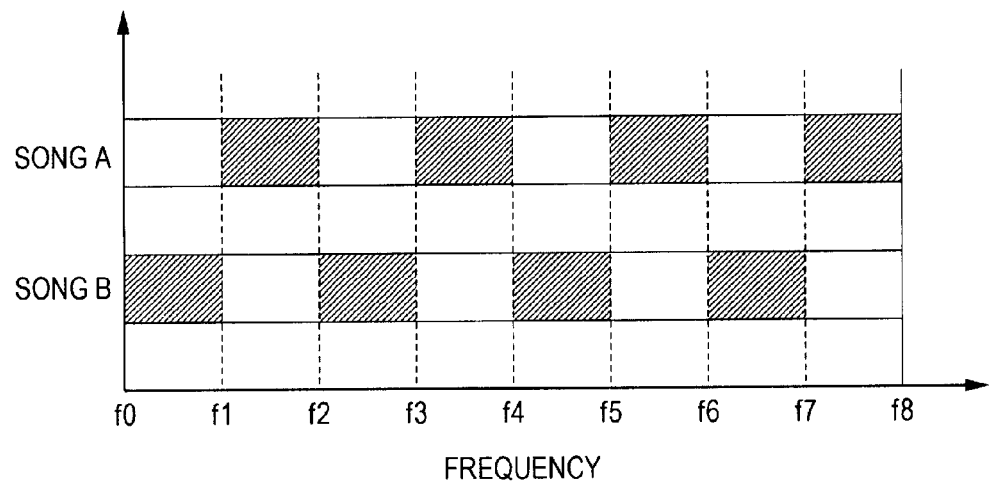
FIG. 3 is a diagram illustrating a frequency band division method of a plurality of sound signals in the embodiment of the present disclosure.

FIG. 3 is a diagram illustrating a frequency band division method of a plurality of sound signals. The horizontal axis of the figure denotes frequency, and the audible band is in the range from a frequency f0 to a frequency f8. In the same figure, the case where the sound signals of two songs A and B are mixed and listened to is shown. The number of songs is not specially limited. In the frequency band division method, the audible band is divided into a plurality of blocks and each block is allocated at least any one of the plurality of sound signals. Thereafter, only a frequency component belonging to the block allocated to each of the plurality of sound signals is extracted.

In the example shown in FIG. 3, the audible band f0 to f8 is divided into eight blocks by dividing the entire frequency range by frequencies f1, f2, . . . , and f7. For example, as denoted by diagonal lines, four blocks f1 to f2, f3 to f4, f5 to f6 and f7 to f8 are allocated to the song A and four blocks f0 to f1, f2 to f3, f4 to f5 and f6 to f7 are allocated to the song B. Here, the frequencies f1, f2, . . . , and f7 which become the boundaries between the blocks are set to, for example, any one of the boundary frequencies of the 24 Bark threshold bands such that the effect of the frequency band division is further increased.

The threshold band refers to a frequency band in which, even when sound having a certain frequency band extends to a larger bandwidth, a masking amount of the other sound is not increased. Masking is a phenomenon in which a minimum audible value of any sound is increased by the presence of the other sound, that is, a phenomenon in which it is difficult to listen to any sound. The masking amount is the increase amount of the minimum audible value. It is difficult to mask sounds in different threshold bands with each other. By dividing the frequency band using the 24 Bark threshold bands approved by experiments, it is possible to suppress influence in which, for example, the frequency component of the song A belonging to the block of the frequencies f1 to f2 masks the frequency component of the song B belonging to the block of the frequencies f2 to f3. The same is true in the other blocks and, as a result, the song A and the song B become sound signals which barely erase each other.

In addition, the division of the entire frequency region into the plurality of blocks may not be performed by the threshold bands. In either case, it is possible to provide the separation information using the frequency resolution of the inner ear, by reducing the overlapping frequency band.

Although, in the example shown in FIG. 3, each block has substantially the same bandwidth, in practice, the bandwidth may be changed by the frequency band. For example, two threshold bands may be set to one block and four threshold bands may be set to one block. In the division method (division pattern), division into the blocks may be determined in consideration of the characteristics of general sound, for example, the characteristics in which it is difficult to mask sound having a low frequency or in consideration of a characteristic frequency band of a song. Here, the characteristic frequency band is an important frequency band in the expression of the song such as a frequency band occupied by a melody. If it is predicted that the characteristic frequency bands overlap each other, the bands may be finely divided and equally allocated so as not to generate a problem where the melody in either song is not heard.

In addition, although, in the example shown in FIG. 3, a series of blocks is alternately allocated to the song A and the song B, the allocation method is not limited thereto and two continuous blocks may be allocated to the song A. Even in this case, for example, when the characteristic frequency band of certain song crosses two continuous blocks, the two blocks may be allocated to that song, that is, the allocation method may be determined such that the generation of the adverse influence of the frequency band division is minimized in the important portion of the song.

(2) Time Division Method

Figure 4:
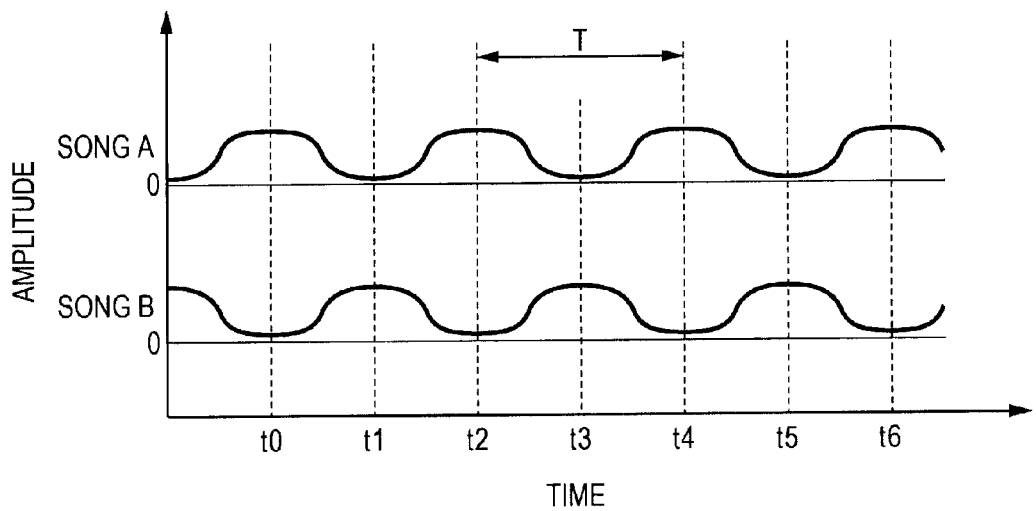
FIG. 4 is a diagram illustrating a time division method of a plurality of sound signals in the embodiment of the present disclosure.

FIG. 4 is a diagram illustrating a time division method of a plurality of sound signals. In the same figure, a horizontal axis denotes time and a vertical axis denotes the amplitude, that is, the volume, of the sound signal. Even in this case, the case where the sound signals of two songs A and B are mixed is shown as an example. In the time division method, the amplitude of the sound signal is modulated in the common period. At this time, the phase of the peak is delayed such that the peak appears at different timings according to the song. In order to approach the inner ear level, the modulation period at this time may be a few tens of milliseconds to few a hundreds of milliseconds.

In the example of FIG. 4, the amplitudes of the song A and the song B are modulated in the common period T. The amplitude of the song B is decreased in time points t0, t2, t4 and t6 when the amplitude of the song A reaches the peak and the amplitude of the song A is decreased a time points t1, t3 and t5 when the amplitude of the song B becomes the peak. In addition, in practice, as shown in the same figure, the amplitude modulation may be performed such that a time point when the amplitude is maximized and a time point when the amplitude is minimized has a certain level of temporal breadth. In this case, the time when the amplitude of the song A is minimized may match the time when the amplitude of the song B is maximized. If three or more songs are mixed, the phase of the peak of each song is equally delayed such that only the amplitude of one specific song may be maximized at a given time.

Modulation of a sine wave which does not have a time width at the time point when the amplitude reaches the peak may be performed. In this case, only the phase is delayed and the timing when the amplitude reaches the peak becomes different. In either case, it is possible to provide the separation information using the time resolution of the inner ear.

(3) Method of Providing Separation Information at Brain Level

Next, a method of providing separation information at the brain level will be described. The separation information provided at the brain level provides a clue recognizing the auditory stream of each sound when analyzing sound in the brain. In the present embodiment, a method of periodically providing a specific change to sound signals, a method of normally performing a processing treatment with respect to sound signals, and a method for changing localization are introduced.

(3-1) In the method of periodically providing the specific change to the sound signals, the amplitudes of all or a part of mixed sound signals are modulated or the frequency characteristics are modulated. The modulation may be performed in a pulse shape for a short period of time or may be performed so as to slowly vary for a long period time. If the common modulation is performed with respect to the plurality of sound signals, the timings of the peaks of the sound signals are different.

Alternatively, a noise such as a flick sound may be periodically provided, a processing treatment realized by a general sound filter may be performed, or localization may be swung to the left or the right. By combining such modulations, applying another modulation by the sound signals, or delaying timings, it is possible to provide a clue to recognizing the auditory stream of the sound signals.

(3-2) In the method of normally performing the processing treatment with respect to the sound signals, one or a combination of various acoustic processes such as echo, reverb, pitch shift and the like, which are able to be realized by a general effector, is performed with respect to all or a part of mixed sound signals. Normally, the frequency characteristics may be different from those of the original sound signals. For example, even in a song having the same tempo by the same instrument, one song subjected to echo processing is prone to be recognized as a different song. If the processing treatment is performed with respect to a plurality of sound signals, processing content or processing strength becomes different according to the sound signals.

(3-3) In the method of changing the localization, different localizations are provided to all of mixed sound signals. By performing acoustic spatial information analysis in the brain in cooperation with the inner ear, it is easy to separate the sound signals. Since the sound separation process by the change of the localization is changed so as to separate the positions of virtual sound sources, it may be referred to as a sound source separation process.

Figure 5:
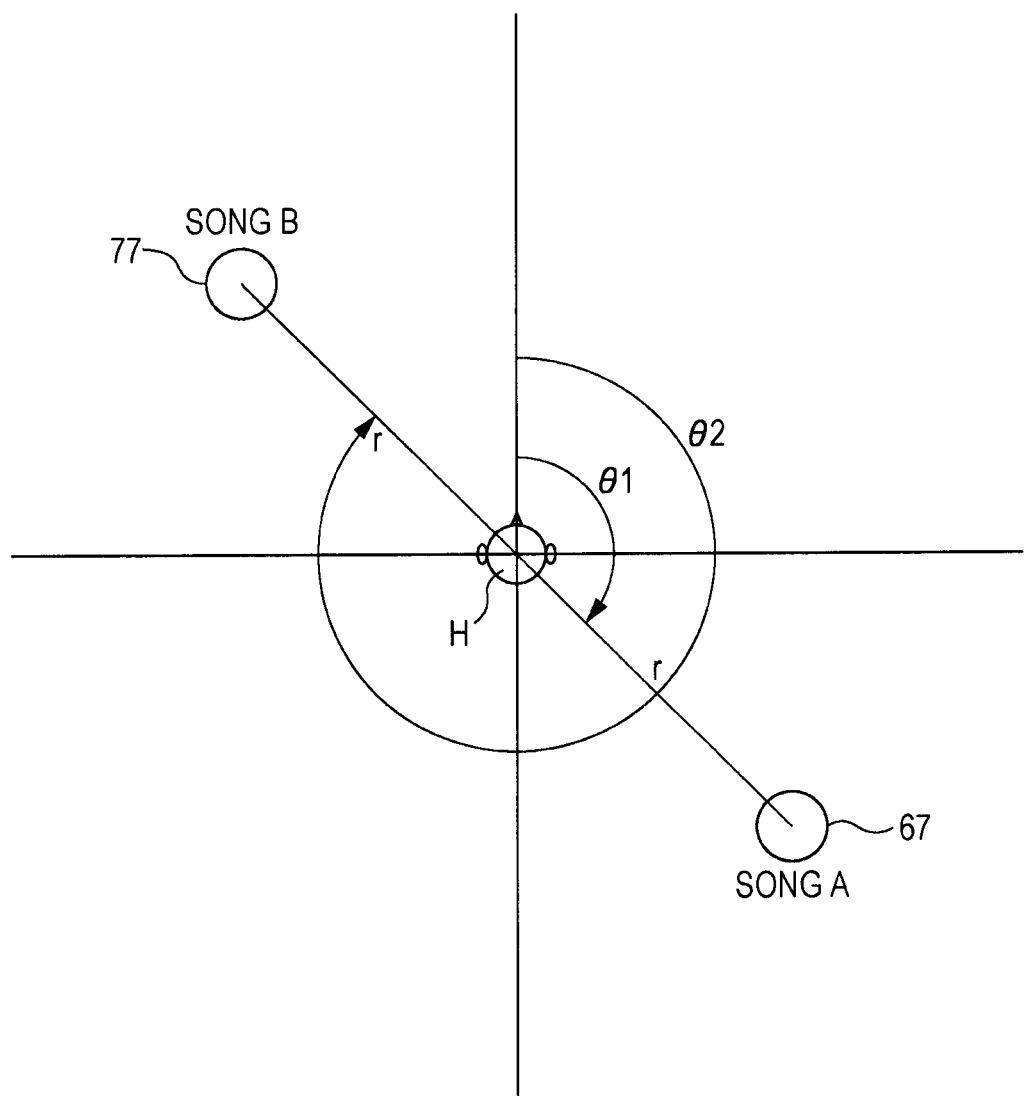
FIG. 5 is a diagram illustrating a method of changing localization in a horizontal plane around a head portion of a user.

For example, as shown in FIG. 5, in a horizontal plane centered on the head portion H of the user, different directions along the whole 360° circumference on the horizontal plane are allocated to sound data of both the song A and the song B. Typically, the localizations are changed so as to allocate virtual sound sources to the two songs A and B in directions 180° different from each other. In the figure, a position 67 to a right back side of the user is allocated to the song A and a position 77 to a left front side of the user is allocated to the song B. Although the positions 67 and 77 are located at the same distance from the user, they may not necessarily be the same distance. Even when the song A itself is in stereo having a plurality of channels and includes a plurality of virtual sound source positions, in this example, the virtual sound source position of the song A is integrated to a single virtual sound source position 67 while the plurality of songs is simultaneously reproduced. Even in the song B, the virtual sound source position is integrated to a single virtual sound source position 77.

Figure 6:
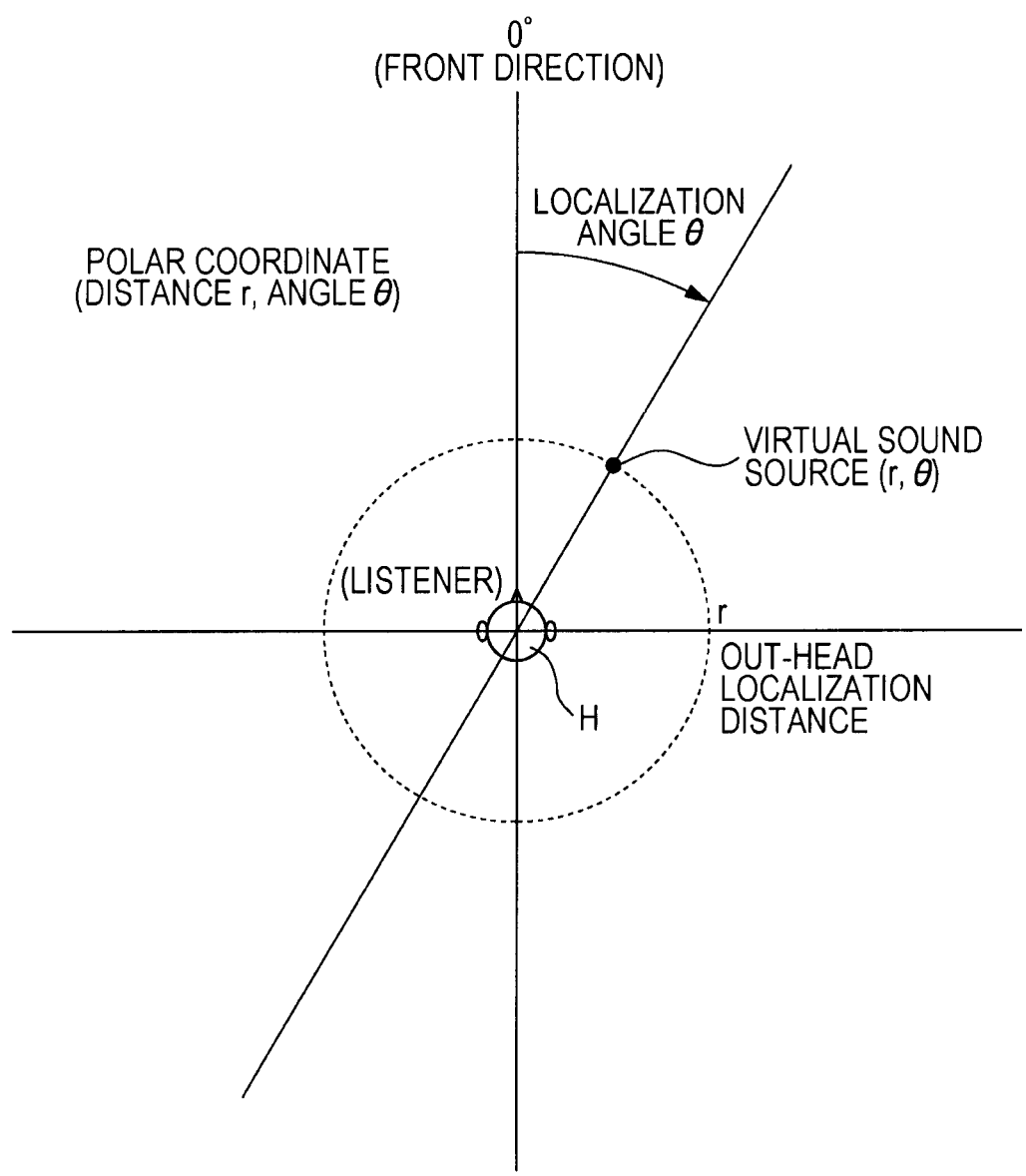
FIG. 6 is a diagram illustrating how to represent the position of a virtual sound source.

As shown in FIG. 6, the virtual sound source position is represented by a song coordinate (that is, a location distance r external to the head and a localization angle θ) in the horizontal plane centered on the head portion H of a listener. In this example, in the localization angle θ, the front direction of the user is 0°.

Although the localization angles of the two songs shown in FIG. 5 are different by 180°, the difference may not necessarily be 180°. For example, an angular interval may be 60° or 90° to the left front side and the right front side. In addition, the direction of the virtual sound source is not limited to the example of FIG. 5. If the number of songs reproduced simultaneously is 3 or more, it is possible to allocate to the respective songs different directions obtained by dividing the whole circumference of 360° by the number of songs.

Figure 7:
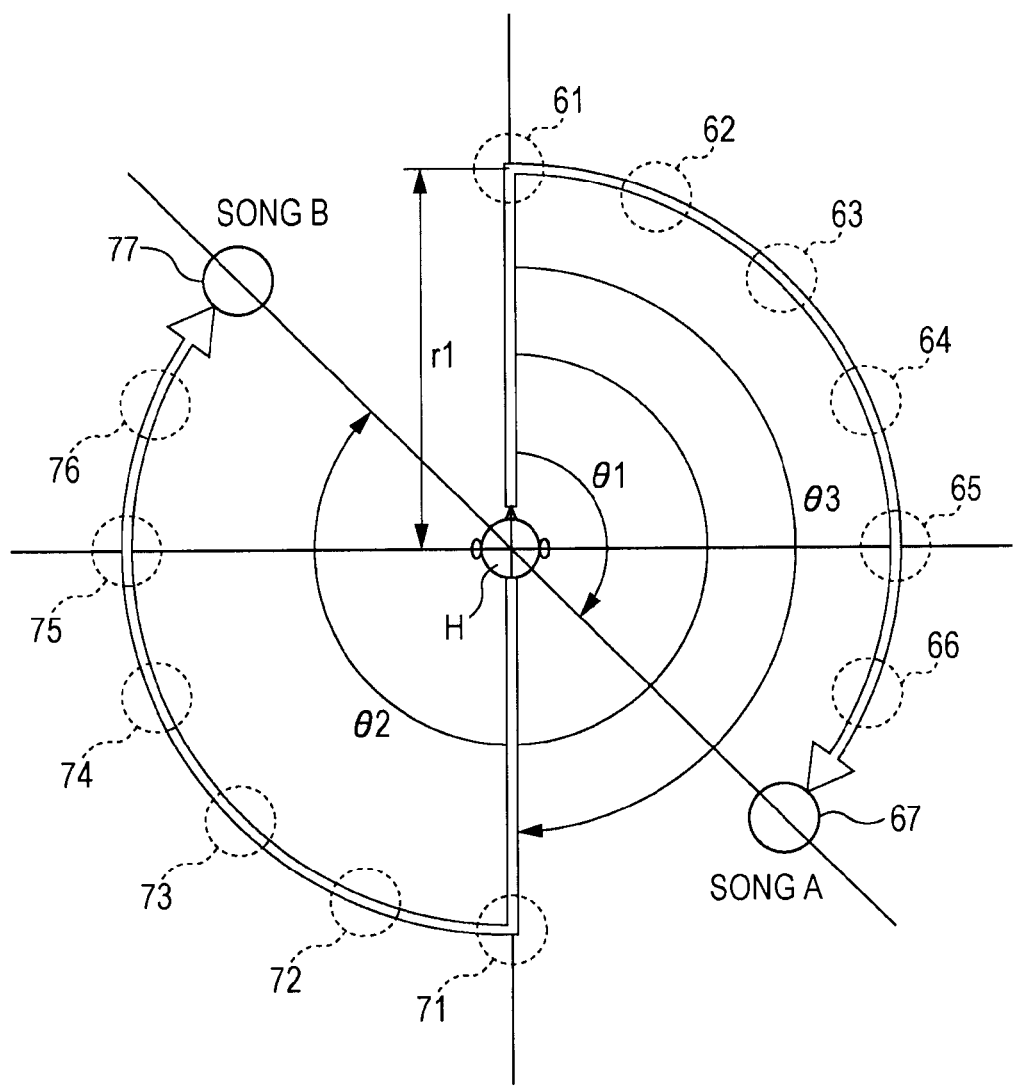
FIG. 7 is a diagram showing a modified example of the method of changing localization shown in FIG. 5.

FIG. 7 is a diagram showing a modified example of the method of changing localization shown in FIG. 5. In this example, when the simultaneous reproduction of a plurality of songs begins, each song does not directly transition to a desired virtual sound source position, but moves along a predetermined path so as to reach the desired virtual sound source position. In this example, in the song A, the predetermined path moves from the center position of the head portion H as a source to a position 61 of a predetermined distance r1, follows positions 62 to 66 on an arc of the radius of the distance r1, and reaches a desired position 67 (r1, θ1). A time necessary for moving the head portion H (or the position 61) to the position 67 is a predetermined time, for example, about 1 second or several seconds. The plurality of stepwise positions on the movement path is, for example, positions of a predetermined angle increment. The angle increment is, for example, an arbitrary angle of 1° to 60°. As this angle is decreased, a smoother localization change is obtained and, as this angle is increased, a rougher change is obtained. A time interval for the movement to an adjacent position may be obtained by dividing the predetermined time by the number of angle steps of the movement path. The same is true in the song B. That is, the predetermined path moves from the head portion H via a position 71 (r1, θ3), follows positions 72 to 76 on an arc, and reaches a position 77 (r1, θ2).

Figure 8:
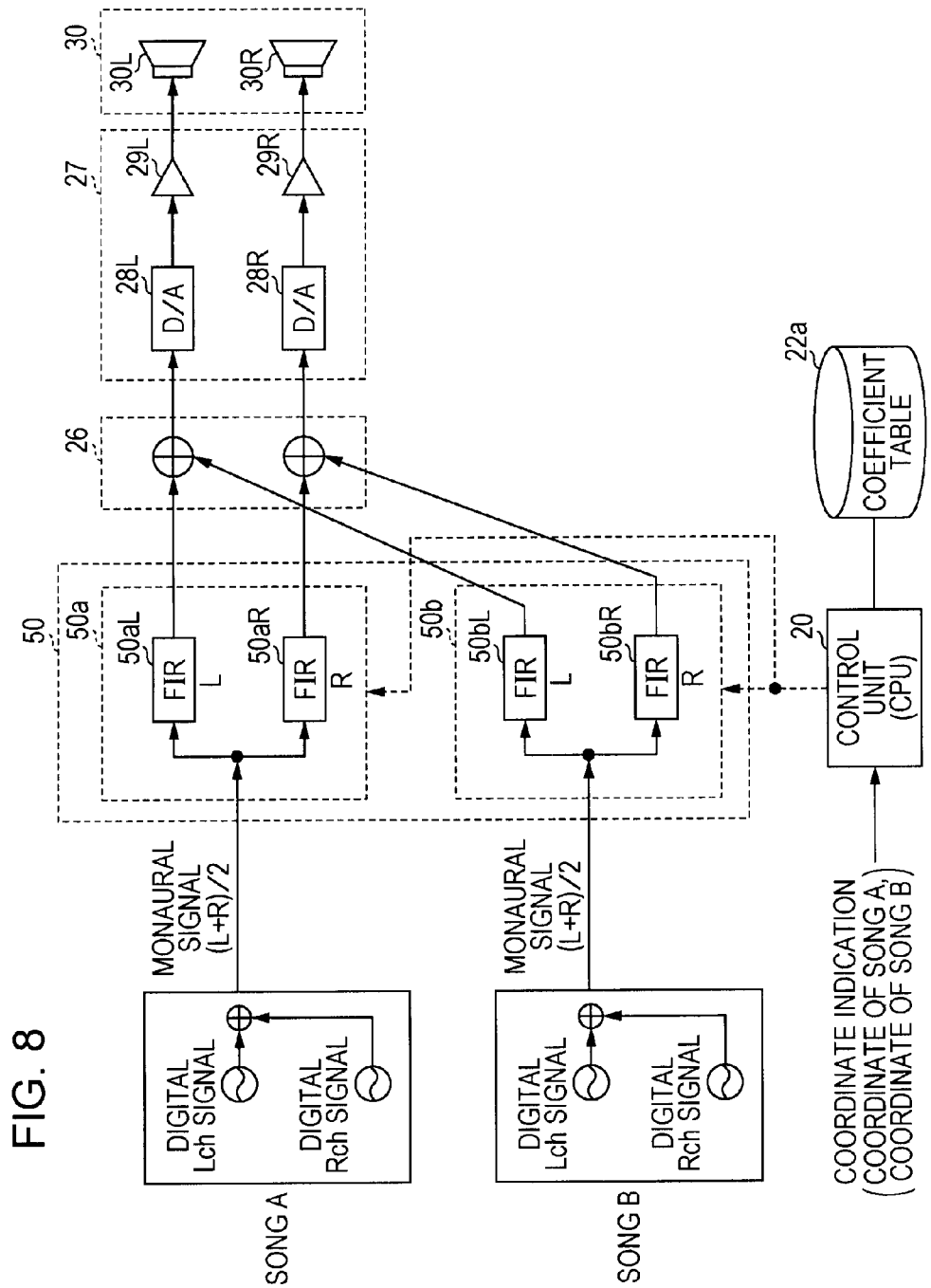
FIG. 8 is a diagram showing a detailed configuration example for changing localization in an embodiment of the present disclosure.

FIG. 8 is a diagram showing a detailed configuration example for changing localization in an embodiment of the present disclosure. In the figure, the same elements as the elements shown in FIG. 1 are denoted by the same reference numbers and thus the description thereof will be omitted.

Now, it is assumed that the song A and the song B are simultaneously reproduced. If the sound signal of the song A obtained from the reproduction device 14 of one unit includes a digital L channel signal and a digital R channel signal, a monaural signal (L+R)/2 obtained by synthesizing both signals is input to the filter unit 50a. The filter unit 50a is formed of Finite Impulse Responses (FIRs) of the two L and R channels as a portion of a localization setting filter 50. If the sound signal of the song A is an original monaural signal, the monaural signal may be input to the filter unit 50a without change.

Similarly, if the sound signal of the song B obtained from the reproduction device 14 of another unit includes a digital L channel signal and a digital R channel signal, a monaural signal (L+R)/2 obtained by synthesizing both signals is input to a filter unit 50b. The filter unit 50b is formed of FIR filters of the two L and R channels as a portion of the localization setting filter 50.

The filter units 50a and 50b receive control parameters from the control unit 20 and generate L and R channel output sound data for realizing predetermined localization. The control parameters are stored in the storage unit 22 in advance as a coefficient table 23. In this example, in the coefficient table 23, parameters of a Head Related Transfer Function (HRTF) are stored. The HRTF is a function indicating the transfer characteristics of sound transferred from a sound source to human ears. This function has a value changed by the shape of the head portion or the ear and the position of the sound source. In contrast, by using this function value, it is possible to virtually change the position of the sound source.

In the above-described example of FIG. 5, the filter unit 50a is controlled such that the song A is heard from the virtual sound source position 67 by the control of the control unit 20. Similarly, the filter unit 50b is controlled such that the song B is heard from the virtual sound source position 77 by the control of the control unit 20.

The L channel output signals of the filter units 50a and 50b are superposed in a down-mixer 26, are converted into an analog signal by a D/A converter 28L of an output unit 27, are amplified by an amplifier 29L, and are output as sound from an L channel speaker 30L of an output device 30. Similarly, the R channel output signals of the filter units 50a and 50b are superposed in the down-mixer 26, are converted into an analog signal by a D/A converter 28R of the output unit 27, are amplified by an amplifier 29R, and are output as sound from an R channel speaker 30R of the output device 30.

Figure 9:
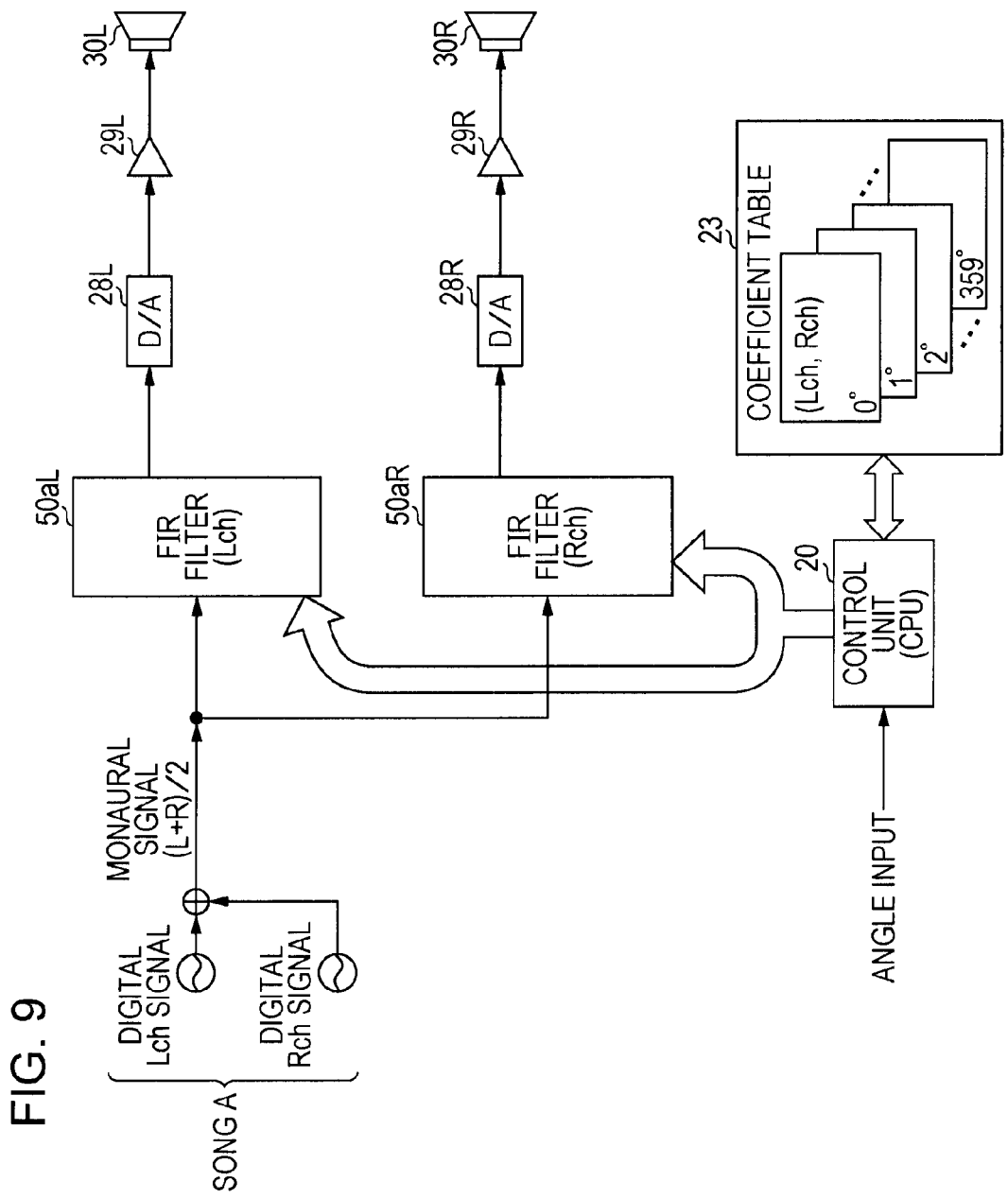
FIG. 9 is a diagram illustrating a detailed example of controlling FIR filters by a control unit shown in FIG. 8.

FIG. 9 is a diagram illustrating a detailed example of controlling FIR filters 50aL and 50aR by the control unit 20. In the figure, for convenience, only the song A is shown. In addition, in the coefficient table 23, table values to be provided to the L channel FIR filter and the R channel FIR filter of every different direction (way) of the virtual sound source are prepared. Although the example of the table values having an angular interval of 1° is shown in this example, the angular interval is not limited to 1°. The distance r from the user to the virtual sound source is set to a predetermined value. If the distance r itself is changed, a coefficient table 23 of each different distance may be provided.

In the examples of FIGS. 5 and 9, if any songs reproduced simultaneously are stereo sounds having left and right channels, at the same time of separate listening, the song is once converted into monaural signals and one song is enabled to be heard from one direction. On the contrary, even at the time of separate listening, it is possible to maintain stereo sound of each song.

Figure 10:
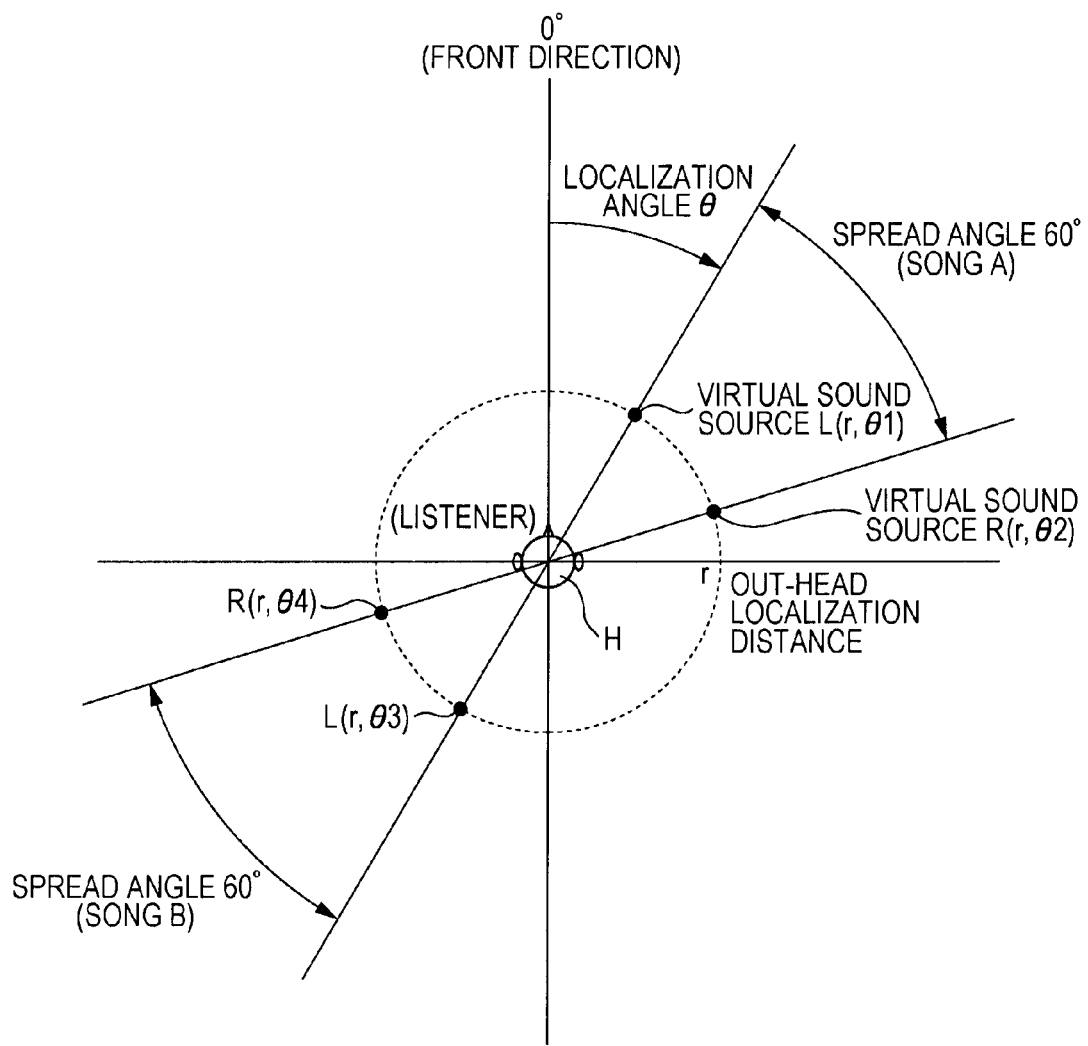
FIG. 10 is a diagram showing an example of separating and listening to stereo sound song A and song B capable of maintaining the stereo sound of each song even at the time of separate listening.

FIG. 10 is a diagram showing an example of separating and listening to stereo sound song A and song B capable of maintaining the stereo sound of each song even at the time of separate listening. In this example, virtual sound sources of both L and R channels are set to positions (r, θ1) and (r, θ2) having an interval of the spread angle of 60° in the right front direction and with respect to the song A and virtual sound sources of both L and R channels are set to positions (r, θ3) and (r, θ4) having an interval of the spread angle of 60° in the left rear direction and with respect to the song B. The direction of each song is not limited to this example. If the number of songs reproduced simultaneously is 2, two directions (exactly opposite directions) having a very large angle difference such as a left front direction and a right rear direction, a left direction and a right direction, or a front direction and a rear direction are preferable.

Figure 11:
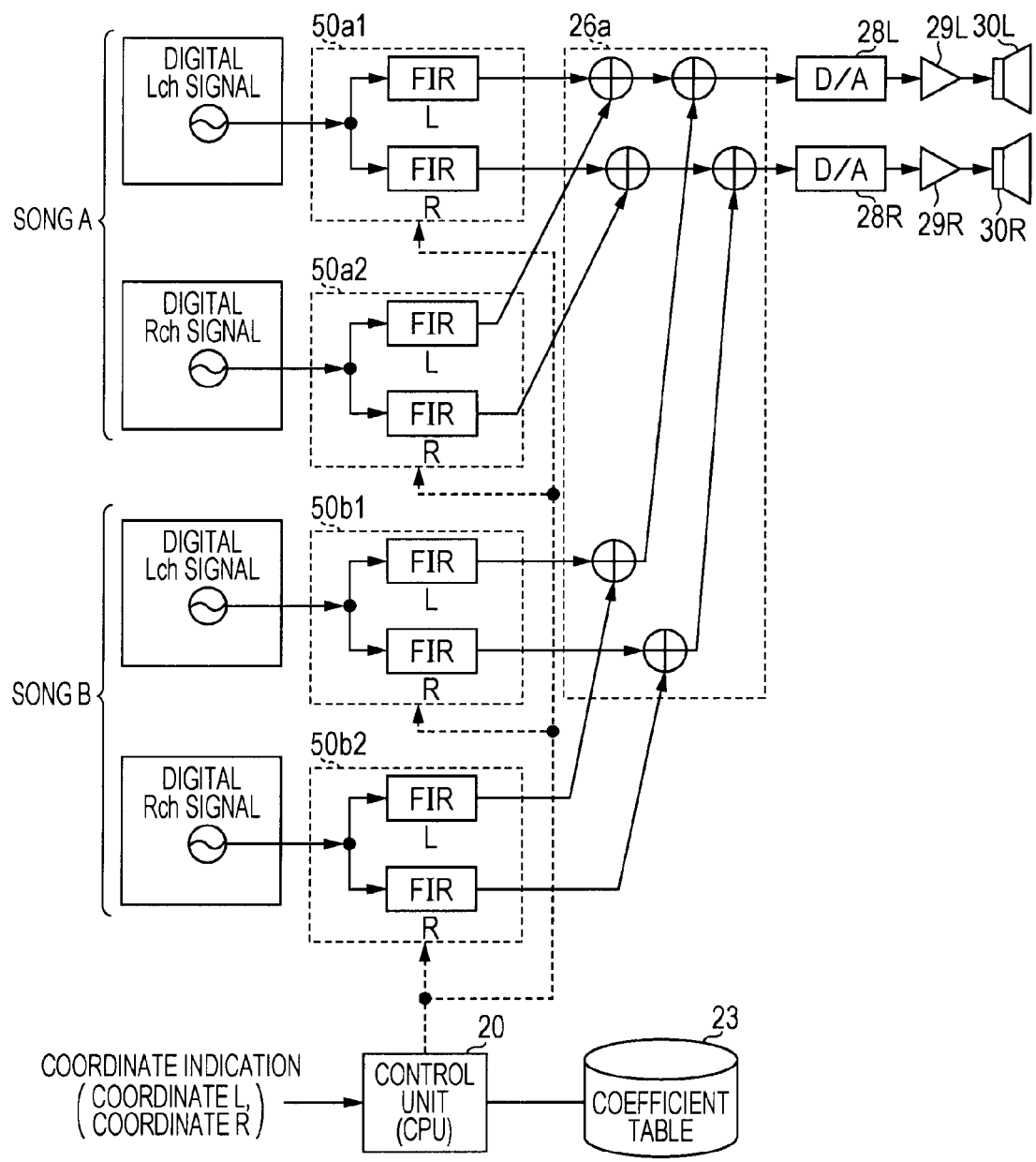
FIG. 11 is a diagram showing a detailed example of controlling the FIR filters by the control unit when separating and listening to the stereo sound song A and song B shown in FIG. 10.

FIG. 11 is a diagram showing a detailed example of controlling the FIR filters 50a1, 50a2, 50b1 and 50b2 by the control unit 20 when separating and listening to the stereo sound song A and song B shown in FIG. 10. In this case, the filter unit 50a1 formed of a set of L and R1 FIR filters is allocated to the L channel signal of the song A and the filter unit 50a2 formed of a set of L and R1 FIR filters is allocated to the R channel signal of the song A. Similarly, the filter unit 50b1 formed of a set of L and R1 FIR filters is allocated to the L channel signal of the song B and the filter unit 50b2 formed of a set of L and R1 FIR filters is allocated to the R channel signal of the song B. The outputs of the filter units are synthesized by the down-mixer 26a with respect to each of the L and R channels and are input to the D/A converter 28L and 28R.

Hereinafter, a characteristic User Interface (UI) of a music reproduction apparatus of the present embodiment using the above separate listening method will be described.

Figure 12:
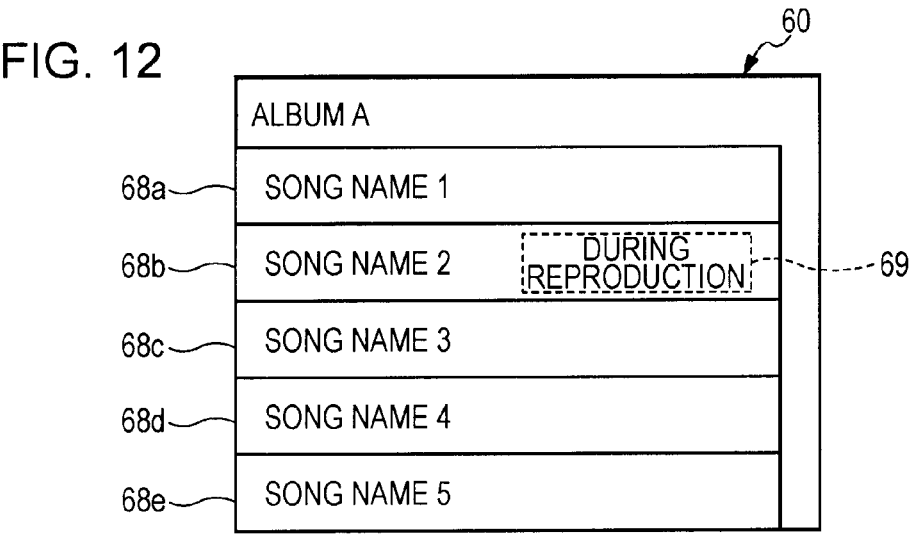
FIG. 12 is a diagram showing an example of a display screen of a music reproduction apparatus according to an embodiment of the present disclosure.

FIG. 12 is a diagram showing an example of a display screen 60 of a music reproduction apparatus. This is an example of the screen configuration displayed on the display unit 19 and shows a list of some of the title information associated with each piece of music data stored in the storage device 12. Here, "list display" is to provide an option of a plurality of pieces of selectively listenable sound data to the user. Information displayed on the display screen 19 of the display unit 60 may be information for specifying each piece of music data such as the character information other than the title information, an image, moving image or the like, associated with each piece of music data. In addition, it is not limited to a list display, a various information displays may be arranged at certain positions and as much song information as possible may be displayed by scrolling.

In the example of FIG. 12, the list of a plurality of reproducible songs 68a to 68e is displayed by text (character lines) on the display screen 60. With respect to the song (song 2) which is currently being reproduced, an indicator 69 indicating the effect, that is, in this example, a character "during reproduction", is displayed. In order to display the reproduction state, it is not limited to the character display. For example, an icon display may be employed, a frame may be plotted, or the color of a row or a frame may be changed.

If a user input unit 18 is a touch panel, a touch area is located on the display screen of the display unit 19 such that the user touches a certain position in the touch area so as to perform a position (coordinate) input. Simultaneously, the display screen of the display unit 19 is displayed to the user. The control unit 20 determines to which position of the display unit 19 the touch (contact) of the user corresponds, based on the input user input information.

Figure 13:
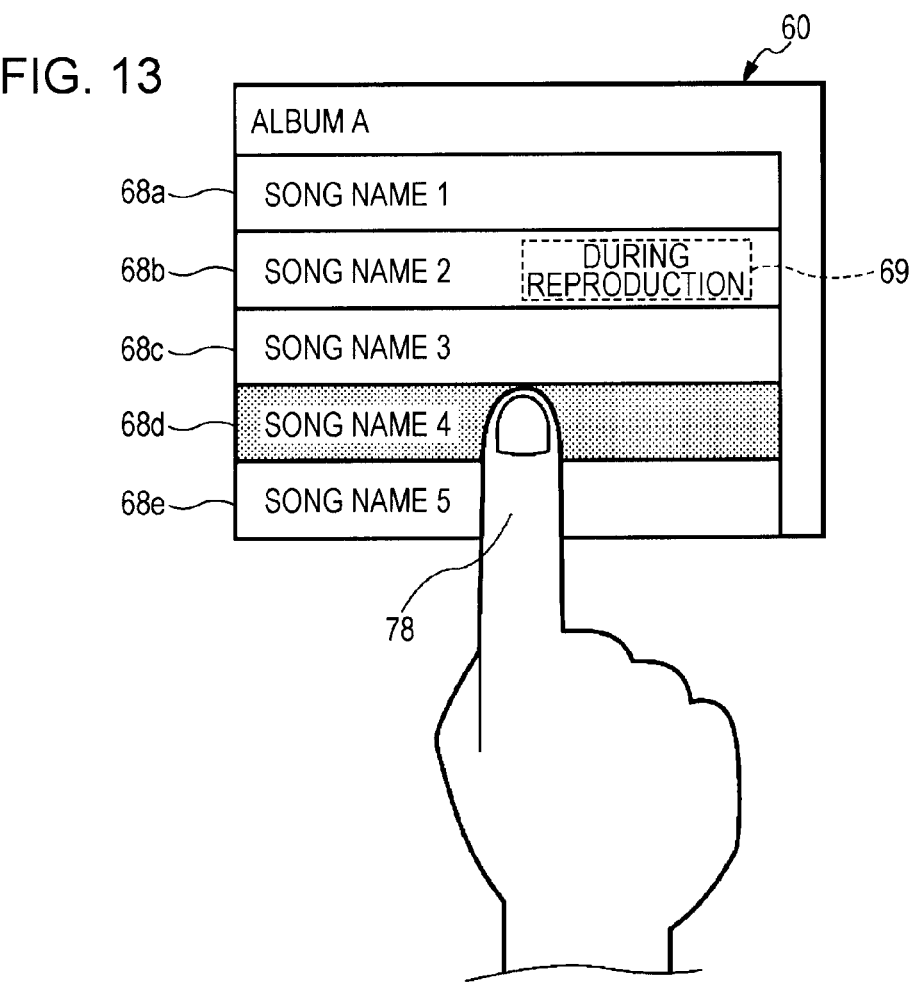
FIG. 13 is a diagram illustrating a predetermined operation of the display screen shown in FIG. 12.

In the state shown in FIG. 12, as shown in FIG. 13, when the user performs a predetermined operation with respect to a song (in this example, song 4) different from the song (in this example, song 2) which is currently being reproduced on the display screen 60, the song which is currently being reproduced and the newly instructed song are temporarily and simultaneously reproduced. In this case, the above-described separate listening method is applied to the reproduction of both songs. The "predetermined operation" is an operation (second operation) different from an operation (first operation) for starting the reproduction of the song and, in this example, a so-called long press is employed in which the touch state on the same position continues for a predetermined time or more.

In more detail, when the finger 78 of the user touches on the touch panel 72, this touch is sensed by the user input unit 18 and the control unit 20 determines to which position of the display unit 19 this touch corresponds. The control unit 20 determines whether the position is located within the area of information for each piece of music data displayed on the display unit 19. If music data is specified by this determination, the user determines that the music data is selected. At this time, the presence or absence of the "long press" is determined by a standby time of a constant time. To this end, a determination as to whether it is a tap operation in which the touch is finished after a short time or the long press is made. The tap operation is generally used as a general operation for selecting a song. That is, if the user taps a position corresponding to each song on the list, it is possible to exchange the reproduced song.

If the touch state continues even after the standby time is finished, it is determined that it is long press. If the music data determined as being selected by the user is music data which is not being reproduced, the control unit 20 begins to reproduce the music data, performs the above-described sound separation process by the sound processing unit 24 with respect to both pieces of music data and outputs the music data to the output device 30 through the down-mixer 26.

Figure 14:
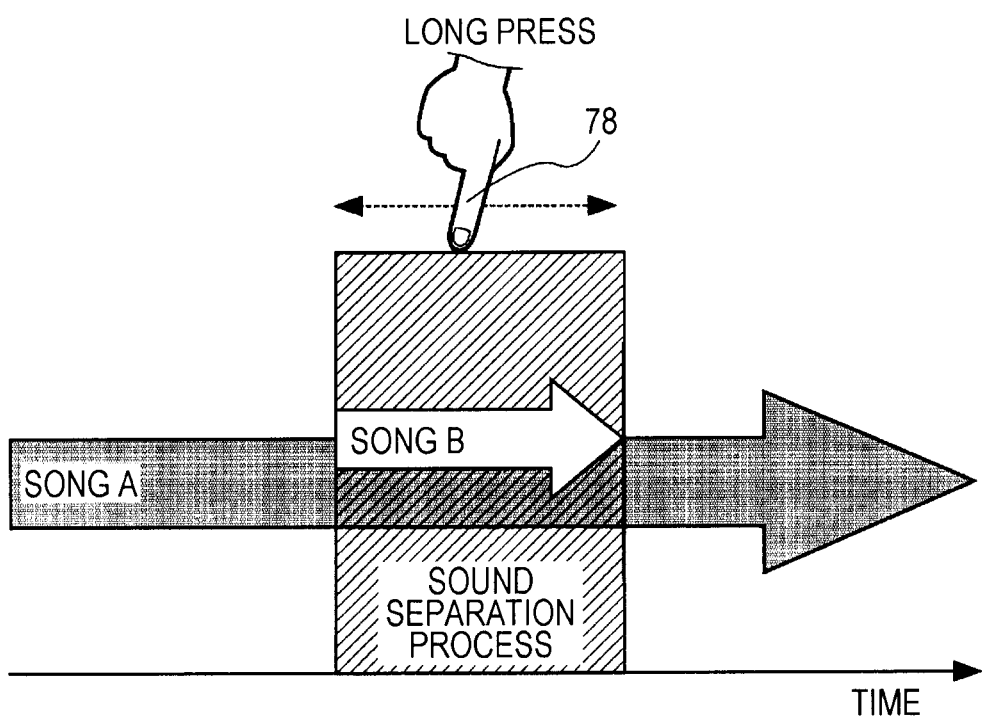
FIG. 14 is a schematic diagram showing the execution of a sound separating process for separate listening by a long depression operation in an embodiment of the present disclosure.

For example, as schematically shown in FIG. 14, when another song B is selected by a long press while a certain song A is reproduced, the sound separation process for separate listening is executed while the long press continues. As a result, the user identify the song A and the song B which are simultaneously reproduced.

At this time, the effect of each filter of the sound processing unit 24 may be changed by the control signal from the control unit 20. This sound separation process continues until the touch of the user's finger 78 on the position corresponding to the song 68d of the touch panel is finished.

When the long press is finished, reproduction of only the original song A is resumed. At this time, the reproduction of the song A does not pause during the long press and the original song A continues to be reproduced as if nothing had happened after the long press.

The song B which is reproduced so as to be superposed partway during the song A may be reproduced from a first part of that song or may be reproduced from a specific middle position. The middle position is, for example, a characteristic song part of that song, which is called a "hook part". Such a song part generally facilitates song search, compared with the beginning part of the song. The position of such a song part (time from a starting point of the song) may use information (not shown) accompanying the music data prepared as meta information of the song.

The user may select whether the reproduction of the song B reproduced partway begins from a partway position or the beginning position as initial setting.

By the operation of the present embodiment, the user may separate and listen to another song without stopping the reproduction of the song which has been heard up to that time. To this end, it is possible to listen to another song as a preview or to compare both songs.

In addition, in the state shown in FIG. 12, the song which is currently being reproduced may be exchanged to another song using the above-described tap operation. In addition, the end of the sound separation process may be determined by another touch operation for the touch panel, for example, an operation for rapidly moving the finger in a state of touching and may be switched to the reproduction of the song selected by the user according to the operation. Such an operation is to move the finger in a touch state at a speed higher than a predetermined speed so as to release the touch state and is generally called a flick operation or merely a flick.

Alternatively, the sound separation process may begin by the above-described tap operation, continue for a predetermined time, and automatically end. Instead of the automatic end, the end of the sound separation process may be determined by another touch operation of the touch panel.

Figure 15:
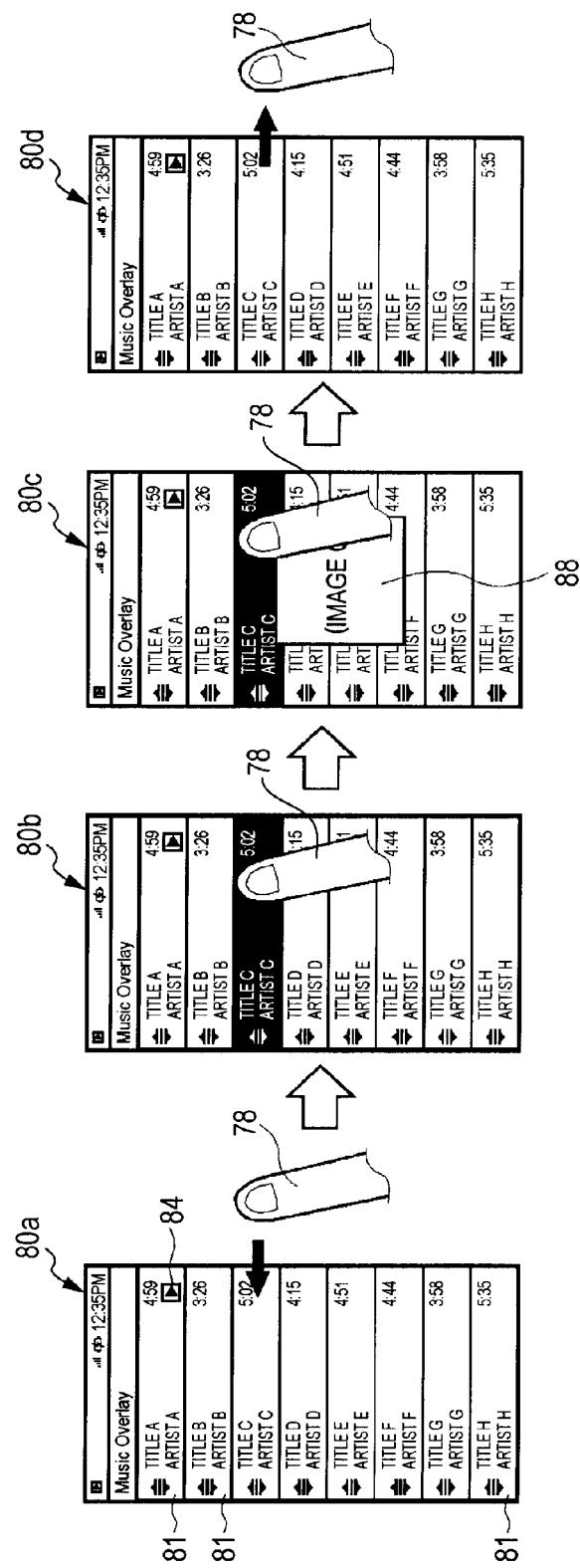
FIG. 15 is a diagram showing an operation example when the present disclosure is applied to a mobile telephone terminal having a music reproducing function or a terminal device such as a mobile music player.

FIG. 15 is a diagram showing an operation example when the present disclosure is applied to a mobile telephone terminal having a song reproducing function or a terminal device such as a mobile song player.

A screen 80a shows a screen for displaying a song list when the music reproducing function is used. Each row 81 of the list shows the title, the artist and the reproduction time of a song as song information. In addition, with respect to a song which is currently being reproduced, a reproduction mark (icon) 84 corresponding to the indicator 69 is displayed in the row 81 thereof.

When the user touches the row 81 of a second song with a finger 78 in a state in which first song (TITLE A) shown on the screen 80a is reproduced like a screen 80b, the row 81 is inverted (or emphasized) and displayed. To this end, the user visually recognizes which song is selected as a search target. The present disclosure is not limited thereto, and an image, an animation or a moving image may be displayed such that the user is informed of the selection.

If the touch satisfies the condition of a "long press", the second song is reproduced so as to be superposed on the first song and the above-described sound separation process is executed. In addition, in this example, with respect to the song of the long pressed row 81, an image 88 stored in advance as the song information thereof is displayed so as to be superposed on the list. To this end, it is possible to provide visual supplementary information of the song to the user. The display of the image is not a necessary element in the present disclosure.

Before and after the sound separation process continues, by providing the change pattern of the parameter previously set in the storage unit 22 to the sound processing unit 24, the listening change felt by the user, which may be generated by the presence or absence of the sound separation process, may be made gradual so as to output a seamless feeling between songs. This operation example will be described later.

If the user releases the touch state of the finger 78 from the state of a screen 80c, the sound separation process is finished and the display of the image 88 and the inversion display of the row 81 are released. To this end, the reproduction of the second song stops and the reproduction of only the first song continues. The display unit 19 returns to a screen 80d equal to the screen 80a.

Although not shown, if the "long press" is newly satisfied with respect to an adjacent row by the movement on the screen in a state in which the finger 78 is touched on the screen in the state of the screen 80c, the new song (third song) is reproduced simultaneously with the first song, as described above.

Figure 16:
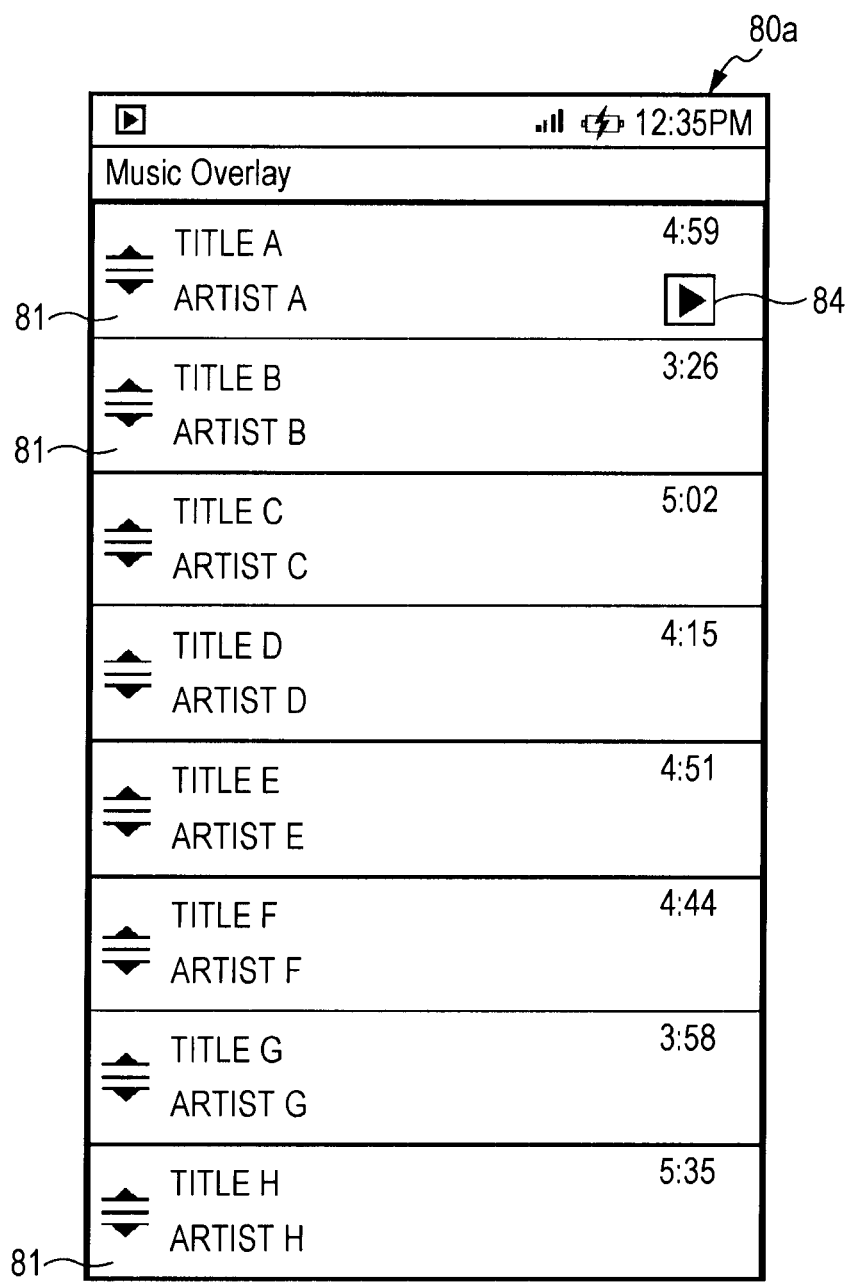
FIG. 16 is an enlarged diagram of a screen of FIG. 15.
Figure 17:
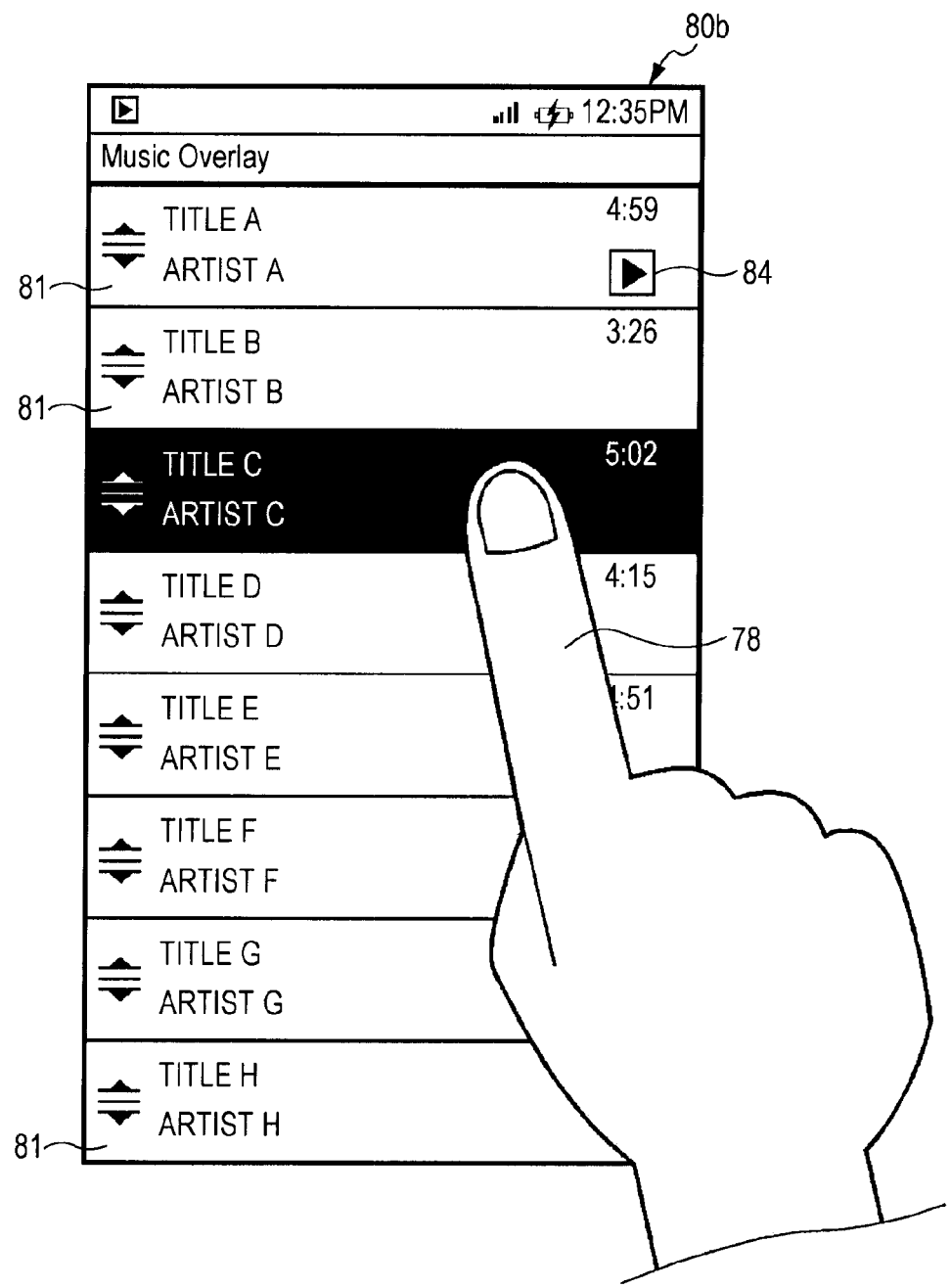
FIG. 17 is an enlarged diagram of a screen of FIG. 15.
Figure 18:
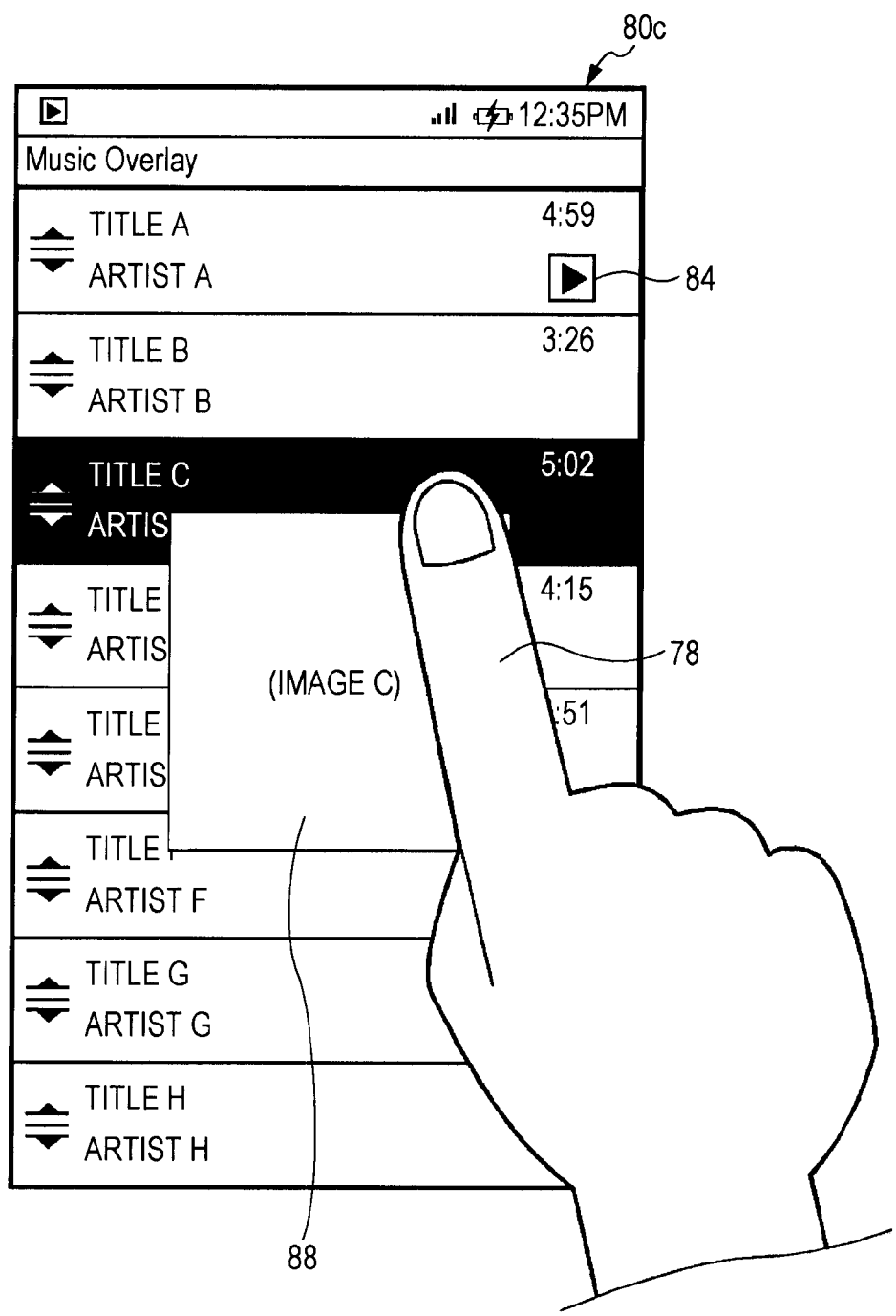
FIG. 18 is an enlarged diagram of a screen of FIG. 15.

FIG. 16 is an enlarged diagram of the screen 80a of FIG. 15, FIG. 17 is an enlarged diagram of the screen 80b of FIG. 15, and FIG. 18 is an enlarged diagram of the screen 80c of FIG. 15.

Figure 19:
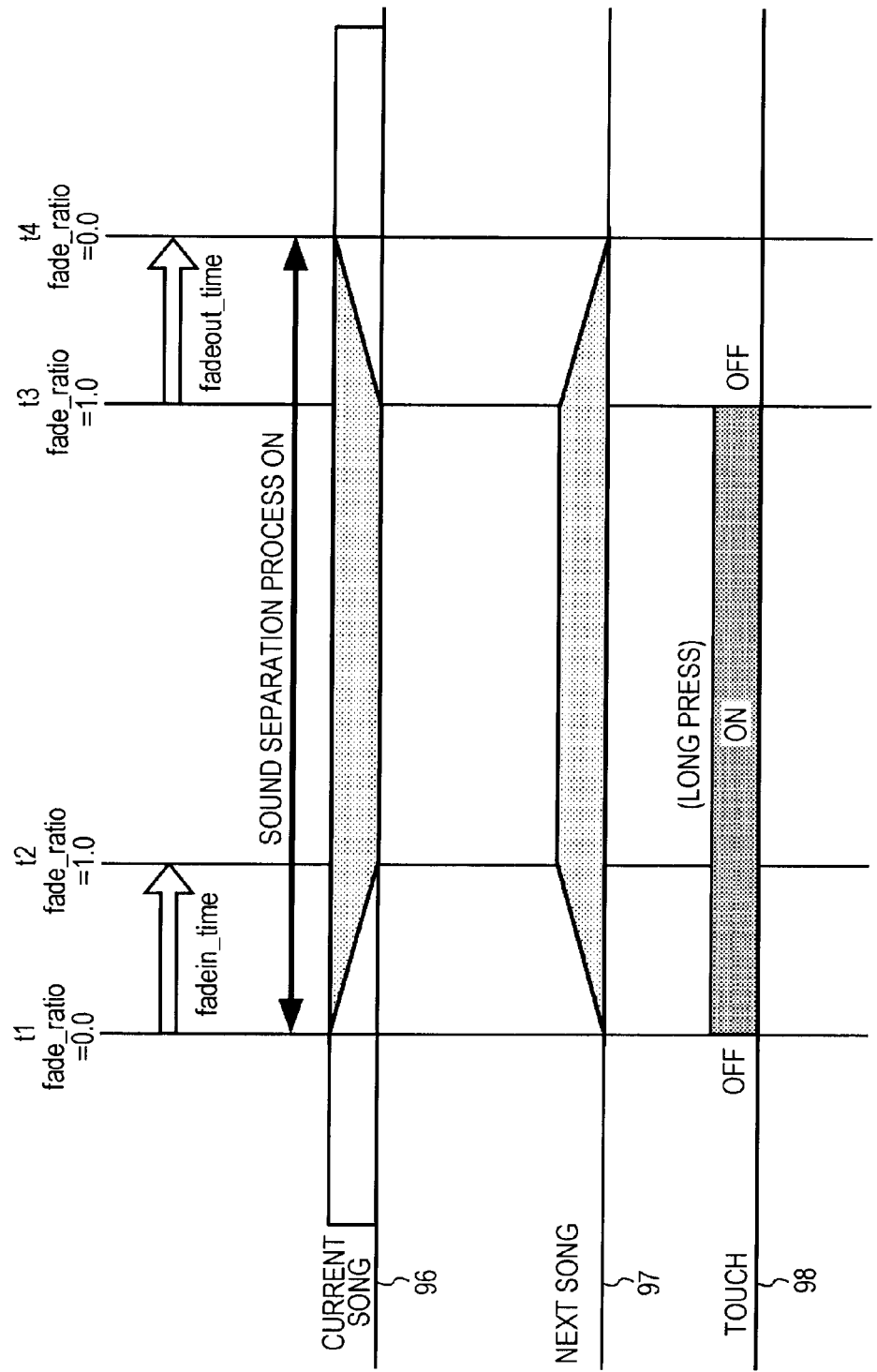
FIG. 19 is a timing chart showing an operation example of a sound separation process for separate listening in an embodiment of the present disclosure.

FIG. 19 is a timing chart showing an operation example of a sound separation process for separate listening. On a horizontal axis as a time axis, a relationship among the current song (first song) 96, the next song (second song) 97 and the touch 98 of the finger of the user is shown. While the current song 96 is reproduced, the sound separation process is turned on at a time point t1 at which the long press of the touch is satisfied. This sound separation process continues up to a time point t4 after a predetermined time of a time t3 when the touch is released and then is turned off.

In this operation example, during the ON time of the sound separation process, transitioning to the simultaneous reproduction state of both songs may not be performed instantly, but may be performed consecutively or in a stepwise manner. Even in the OFF time of the sound separation process, the simultaneous reproduction state of both songs does not transition to the original state, but may transition consecutively or in a stepwise manner to the original state. Such a process is not indispensible in the present disclosure, but the effect where the audible reception of the user is facilitated while avoiding a rapid change applied to the ears of the user is obtained.

The transition time from the time point t1 to t2 during the ON time of the sound separation process is called a fade-in time. Similarly, the transition time from the time point t3 to t4 during the OFF time of the sound separation process is called a fade-out time. In the present specification, fade-in refers to a transient state in which the function of the sound separation process transitions from 0% to 100%. In addition, fade-out refers to a transient state in which the achievement rate of the function of the sound separation process returns from 100% to 0%.

The content of the achievement rate of the sound separation process may vary according to the kind of the above-described separate listening method.

For example, in the localization change, as described with reference to FIG. 7, the angle from a start angle to a target angle when the direction in which a song is heard is changed consecutively or in a stepwise manner corresponds to the achievement rate.

In the frequency division method described with reference to FIG. 3, the song A and the song B were equal in terms of the allocation number of frequency-divided blocks. Instead, by changing to an unequal number of blocks allocated to both songs, the achievement rate of the sound separation process may be changed. For example, all blocks may be allocated to the song A at a fade-in start time point, the number of blocks allocated to the song A may be decreased from a state in which the block is not allocated to the song B, and the number of blocks allocated to the song B may be increased. A time point when the numbers of blocks allocated to both songs become equal becomes a fade-in end time point. The fade-out becomes a reverse operation thereof.

Although, in the division method described with reference to FIG. 4, the peak time was equally allocated to the song A and the song B, the peak time may be unequally allocated to both songs so as to change the achievement rate of the sound separation process. In this case, there are a method of fixing the time interval of the peak and changing the number of peaks and a method of changing the time interval of the peak. For example, the overall time peak may be allocated to the song A at the fade-in start time point, the allocation ratio of the peak time to the song A may be decreased from a state in which the peak time is not allocated to the song B, and the allocation ratio of the peak time to the song B may be increased. A time point when the allocation ratios of the peak times of both songs become equal becomes a fade-in time point. The fade-out becomes a reverse operation thereof.

In addition, in the present disclosure, the fade-in and the fade-out shown in FIG. 19 are not indispensible. In addition, only one (for example, only fade-in) of the fade-in and the fade-out may be employed.

Figure 20:
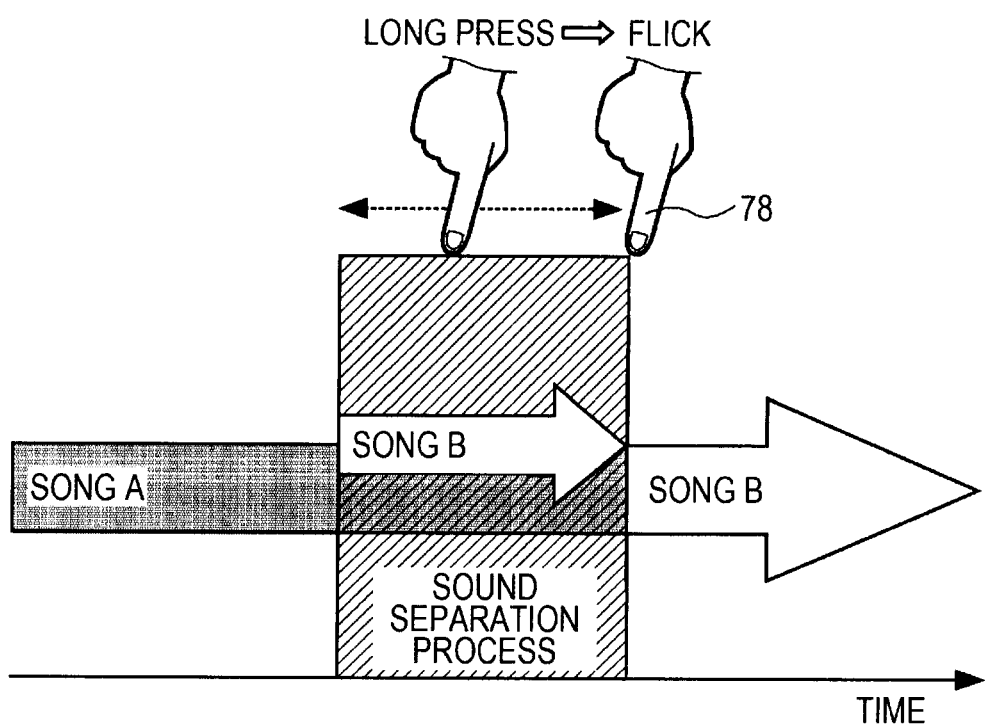
FIG. 20 is a diagram showing another operation example of a user interface in the embodiment shown in FIG. 14.

FIG. 20 is a diagram showing another operation example of the user interface in the present embodiment shown in FIG. 14. In the description of FIG. 14, the simultaneous reproduction of the song A and the song B is returned to the reproduction of only the original song (song A) at the end time point of the long press by the user. In contrast, subsequent to the long press state, if a predetermined operation (third operation) different from a predetermined operation (second operation) for the separate listening method is performed, the original song is stopped and the next song (the song B indicated later) is reproduced. As the third operation, the above flick operation may be employed. As described above, even though the song B may be reproduced at a midway part at the time of the simultaneous reproduction, the reproduction of the song B in this case may begin from the beginning of the song.

Next, another example of the user interface according to the present embodiment will be described. The user interfaces shown in FIGS. 13, 15 and the like are for allowing decision by user operation when the list of song information is displayed using text (character string). In contrast, a user interface using an image corresponding to each song may be considered.

Figure 21:
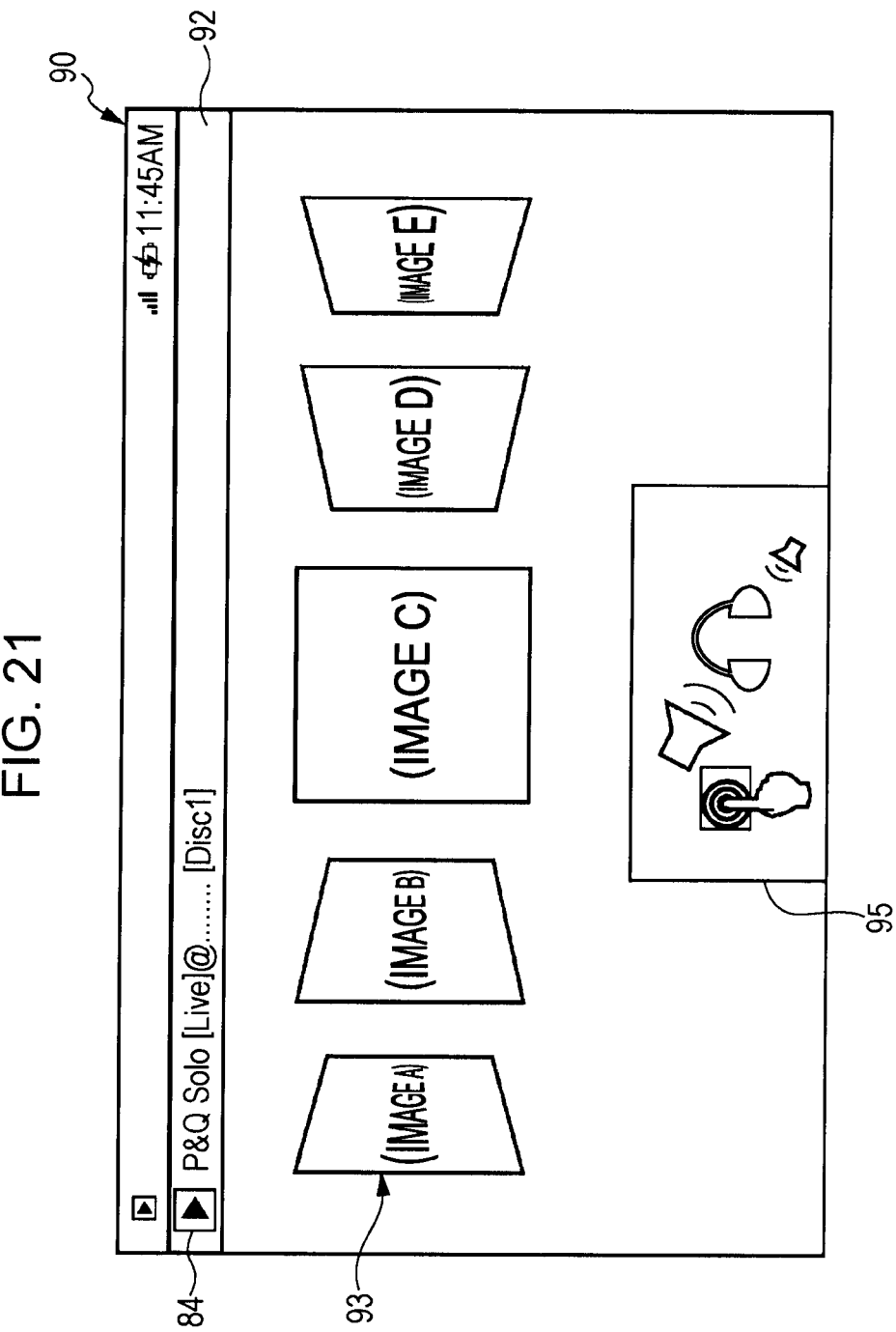
FIG. 21 is a diagram showing an example of a display screen for realizing a user interface according to an embodiment of the present disclosure.

FIG. 21 is a diagram showing an example of a display screen 90 for realizing such a user interface. That is, a plurality of images corresponding to a song is displayed using a song list for selecting songs as an image list. In this example, the display screen is horizontally long and the images (image items) corresponding to a song are horizontally arranged in parallel on the upper side. A song may be selected by selecting any one of the image strings 93. Regarding this example, a touch panel is used as a pointing device. However, the pointing device is not limited to a touch panel.

The image string 93 may horizontally move and, with respect to images greater in number than the number (in the example of the FIG. 5) of images capable of being displayed on the display screen at once, images hidden outside the display screen may be displayed. This operation is called a scroll operation of the image string 93. The scroll operation of the image string 93 may be performed by a predetermined operation by the user.

For example, the user may touch the screen with the finger in the display area of the image string 93 (or a specific image) and moves in a horizontal direction so as to perform a horizontal scroll operation of the image string 93. Accordingly, the beginning image of the movement direction is moved to the outside of the display screen and the image located outside the display screen is displayed in the display screen from the rear side of the movement direction. In the example of the figure, the image located on the center of the display screen is displayed in a state of facing to the front and the other left and right images are obliquely displayed. Such a display form is not indispensible in the present disclosure.

On such an image list, by performing the first operation (in the above example, the tap operation) with respect to several images, it is possible to instruct the selection and the reproduction of the song. If the reproduced song is desired to be changed, a desired image is tapped again so as to change the reproduced song.

Any image of the displayed image string 93 may be subject to a so-called drag operation for moving only the image according to the movement of the finger in a state in which the user touches the screen with the finger. In this example, the movement of the single image may be performed by the drag operation only in a vertical direction. In this example, the operation of the horizontal direction is recognized as the instruction operation of scrolling of the image string 93.

Even in the touch movement operation of the finger in the same horizontal direction, the flick operation and the drag operation are different, and, if scrolling of the image string 93 is realized by only the flick operation, the drag operation of the single image may be performed in the horizontal direction. The drag operation and the flick operation are different in that the movement speed of the finger is lower than a predetermined speed in the drag operation and the movement speed of the finger is higher than the predetermined speed in the flick operation.

In the example of FIG. 21, during the reproduction of a certain song, while the long press operation or the drag operation is performed with respect to an image other than the image of that song, the simultaneous reproduction and the sound separation process of the present embodiment are executed. The title and the like of the song which is currently being reproduced is displayed in a band-shaped display area 92 of an upper portion, together with a reproduction mark 84 as an indicator.

That is, the finger is touched in the display range of any of the images for a certain time and is then moved such that each of the images are dragged and moved in the screen. If the finger is separated from the screen, the images are returned to their original positions at that time. At this time, the images may be smoothly returned to their original positions by consecutively changing the display positions.

The purpose of performing the drag operation is to execute a predetermined function when an image is dragged and dropped in a specific area 95 on the display screen 90, in the example of FIG. 21. As the predetermined function, for example, when a drag and drop operation of the image of a certain song in the area 95 is performed, a function for adding that song to a playlist is included. Although the playlist itself is not specially shown, it may be displayed on a separate screen by an instruction of the user. In addition, the image displayed in the area 95 in the figure is to indicate to the user that a plurality of songs may be separated and heard by the long press operation. During the simultaneous reproduction, the area 95 is emphasized and displayed. As an example of the emphatic display, highlighted display (luminance variation), color variation, inversion display, blinking display, or the like may be used.

Figure 22:
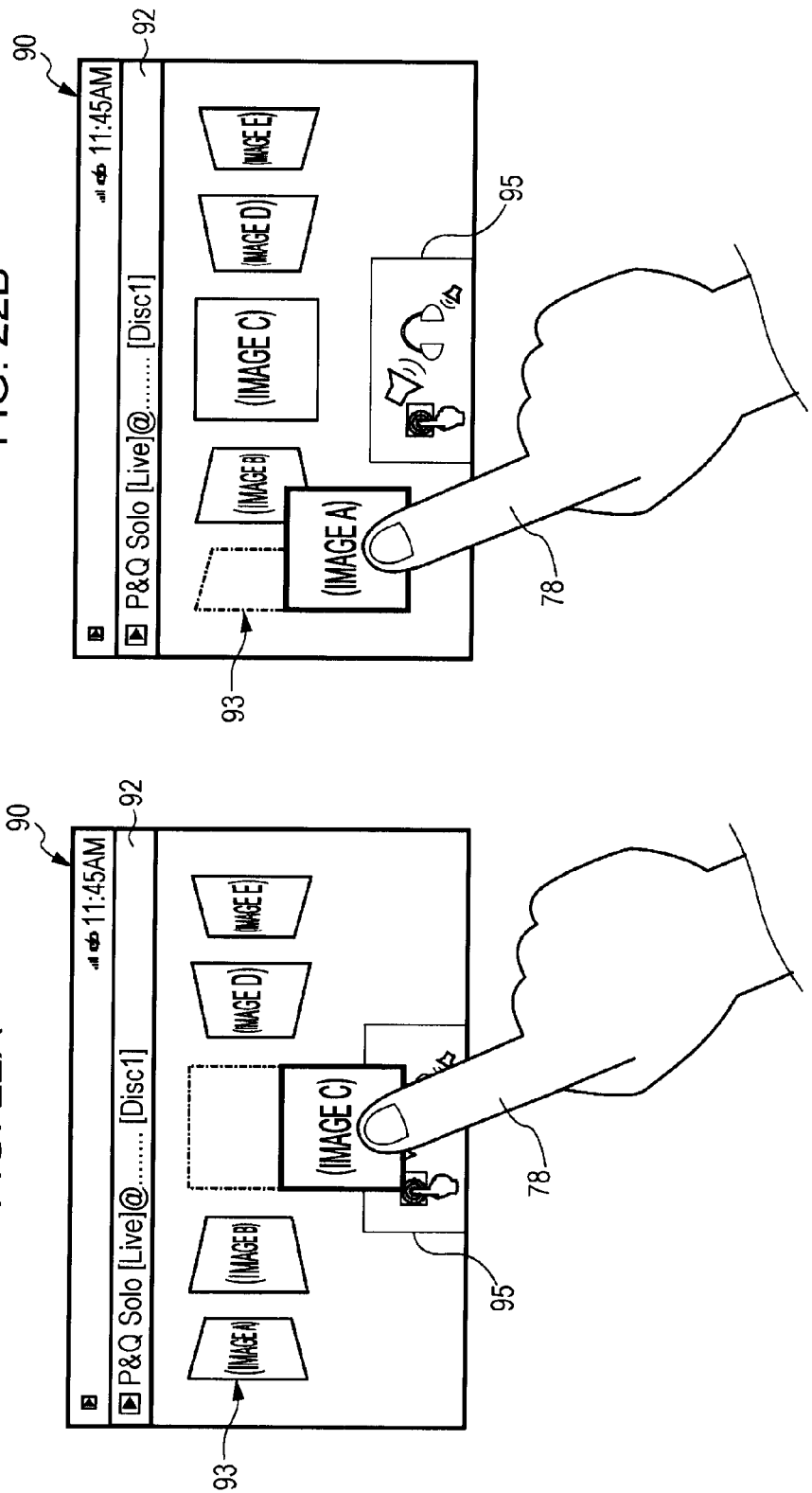
FIGS. 22A and 22B are diagrams illustrating a drag operation of an image in an image list in an embodiment of the present disclosure.

Now, in a state in which a certain song X is simply reproduced, as shown in FIG. 22A, when the user drags an image (song C) located on the center of the screen, the song C is additionally and simultaneously reproduced and the above-described sound separation process is performed with respect to both the song X and the song C. (In this example, the song X corresponds to the image outside the screen). This state continues while the user drags the image corresponding to the song D. Accordingly, meanwhile, the user can separate, recognize and listen to both songs. At this time, since it is visually indicated to the user that the sound separation process is performed, the area 95 is emphasized and displayed.

FIG. 22A shows a state in which the image C of the center of the image string is dragged. When the drag operation of the image C begins during reproduction of a song corresponding to an image different from image C, the simultaneous reproduction accompanying with the sound separation process of both songs is performed. As shown in FIG. 22B, the drag operation is not limited to the image of the center of the image string and a drag operation of a certain image corresponding to the song in the screen may be performed. Although, in FIG. 22B, the inclined image (image A) is dragged and changed to an image facing the front for ease of visibility, the image may be maintained in the state of being inclined.

Figure 23:
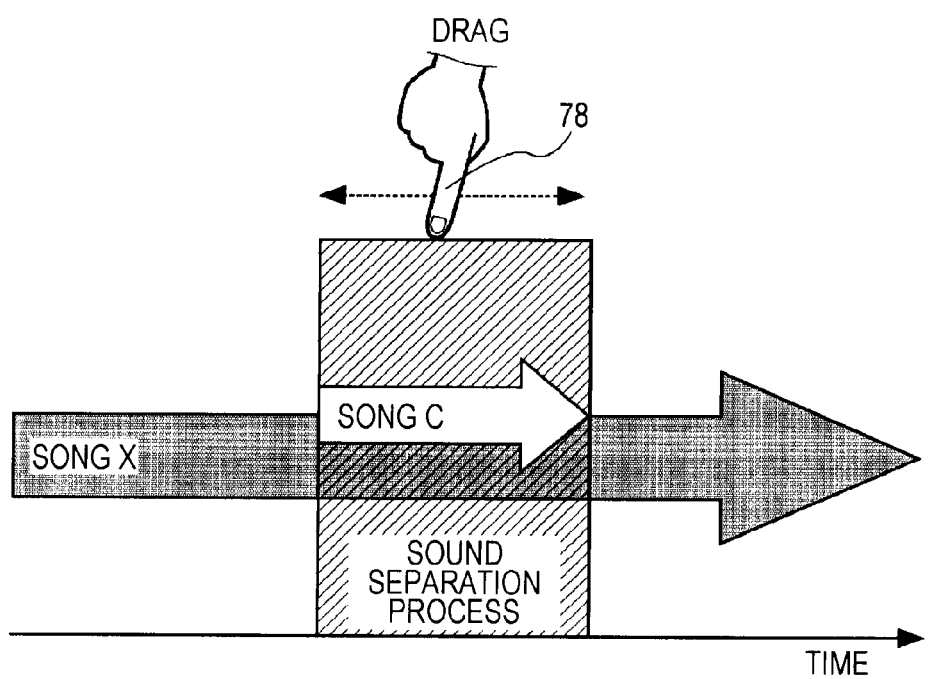
FIG. 23 is a schematic diagram showing a state in which a plurality of songs is simultaneously reproduced by the drag operation shown in FIG. 22.

FIG. 23 is a schematic diagram showing a state in which a plurality of songs is simultaneously reproduced by the drag operation. If the drag operation of the image of the song C is executed during reproduction of the song X, the simultaneous reproduction accompanying with the sound separation process of the song X and the song C is continuously executed during the period of the drag operation. The independent reproduction state of the original song X is resumed at a time point when the drag operation finishes.

Figure 24:
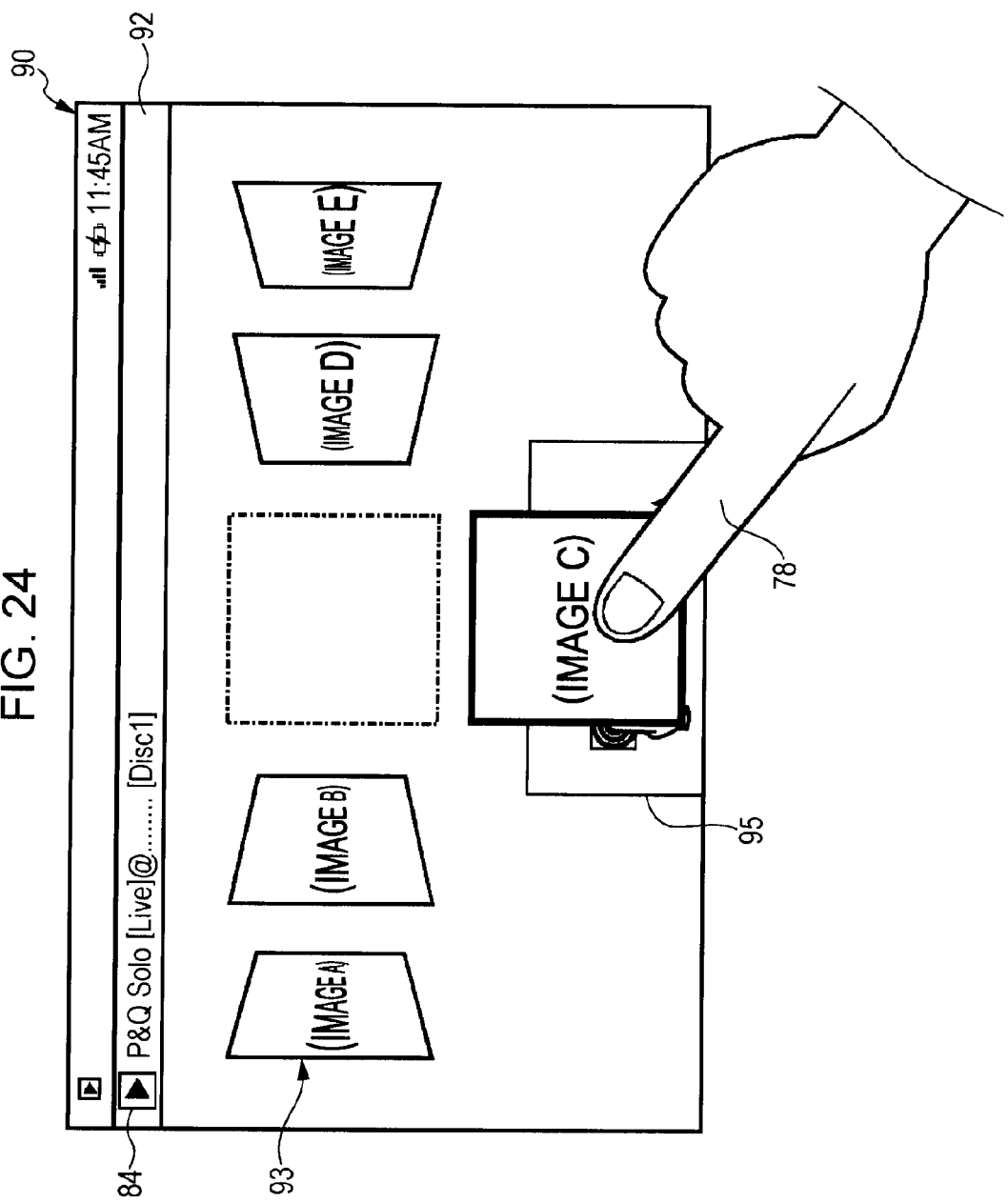
FIG. 24 is a diagram illustrating a predetermined function by a drop function performed subsequent to the drag operation shown in FIG. 22.

As shown in FIG. 24, if the specific image (in the example of the figure, the image C) corresponding to the song is dragged and dropped in the area 95, as the predetermined function, for example, this song is added to the playlist. When the user separates the finger 78 from the screen, the image C returns to the original position on the screen. When the simultaneous reproduction is completed, the reproduction of the original song alone is resumed.

In addition, subsequent to the drag operation, when the user does not merely separate the finger 78 from the image, but performs the above-described third operation (for example, the flick operation), the simultaneous reproduction state may transition to the independent reproduction of the song corresponding to the dragged image.

Figure 25:
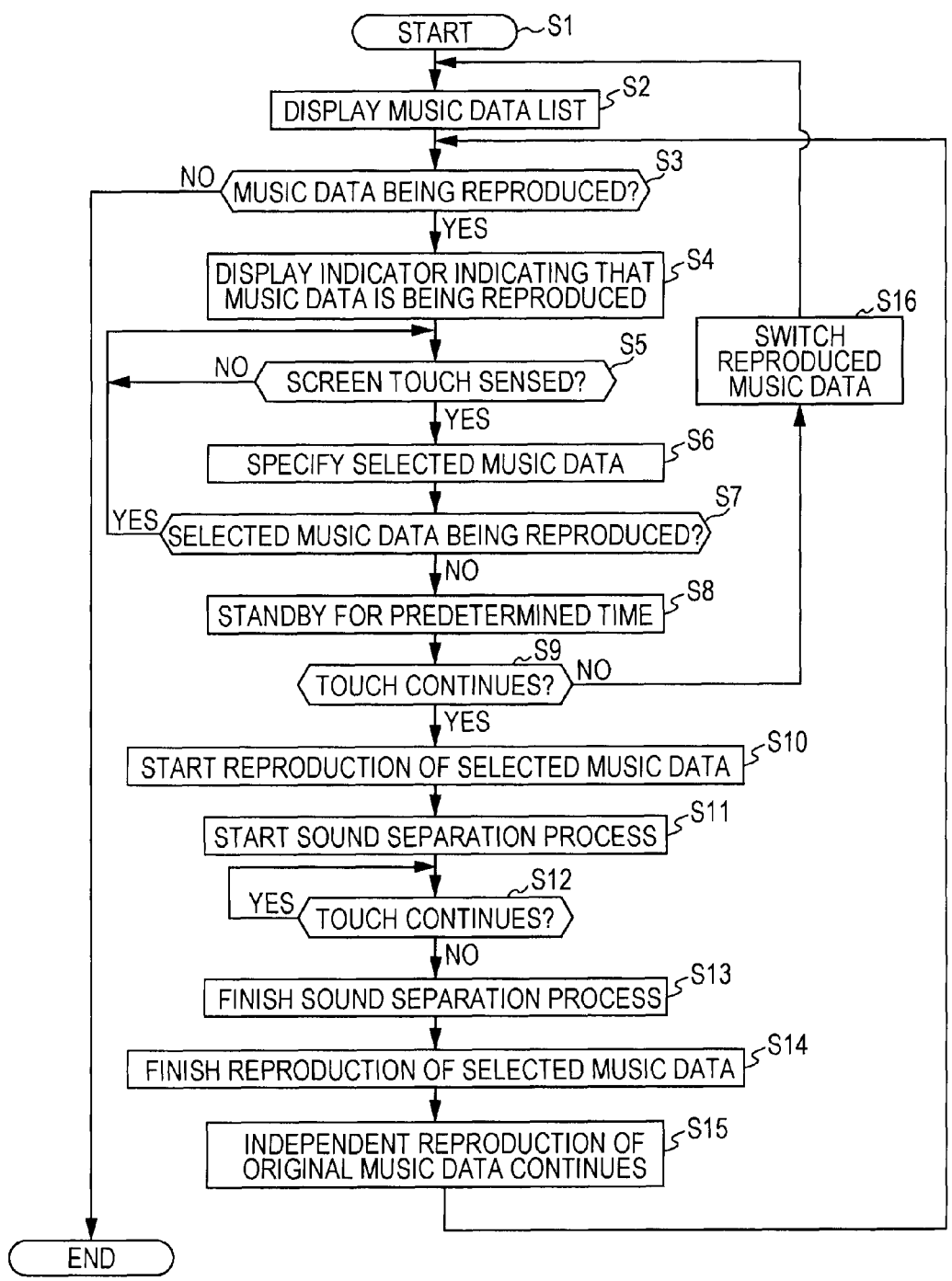
FIG. 25 is a flowchart illustrating a process of a sound processing device in an example of an embodiment of the present disclosure.

FIG. 25 is a flowchart illustrating a process of the sound processing device 16 in an example of the present embodiment. This process begins according to a predetermined instruction of the user by the user input unit 18 (S1).

First, the display unit 19 displays the list of associated information from the music data stored in the storage device 12 (S2). As described above, this list may either text or images.

Next, in the music data displayed in the list, it is determined whether or not music data which is currently being reproduced is present (S3). If the music data which is being reproduced is present, the indicator indicating that the music data is being reproduced is additionally displayed on the display area associated with the music data (S4). If the music data is not being reproduced in step S3, no processing is performed and the present process finishes.

After step S4, whether or not valid contact (touch) of the touch panel formed of the display unit 19 and the user input unit 18 is present (S5) is monitored. When such contact is sensed, for example, when the finger of the user is touched on the touch panel, the process progresses to step S6. In step S6, it is specified to which area of the information associated with the music data displayed on the display unit 19 the touch position sensed in Step S5 corresponds. It is determined that the music data corresponding to the specified area is selected.

In step S7, it is determined whether or not the music data selected in step S6 has been already reproduced. If the music data has been already reproduced, the process is not performed and thus returns to step S5. If the selected music data has not been already reproduced, the process progresses to step S8. In step S8, standby of a certain time is performed. The certain time is a threshold for determining whether or not the touch is a long press and may be set to, for example, about 0.5 seconds. This predetermined time may be adjusted by the user.

In step S9, it is checked whether the touch state is continuously maintained after the certain time is elapsed. If the touch has already disappeared after the lapse of the certain time, the user determines that only the switching of the reproduced data is intended and the process progresses to step S16. In step S16, the music data which is currently being reproduced is stopped, the reproduction of the music data selected by the touch begins, and the process returns to step S2.

If it is determined that the touch is continuously maintained in step S9, the process progresses to step S10. In step S10, the reproduction of the music data selected by the touch begins and the process progresses to step S11. At this time, the reproduction of the music data which has been reproduced up to that time continues. In step S11, the above-described sound separation process begins by the sound processing unit 24 with respect to all music data which is being reproduced. The sound data processed by the sound processing unit 24 is synthesized by the down-mixer 26 and is output to the output device 30. At this time, in the display unit 19, the selected music data may be visually emphasized by changing the color used for the information part associated with the selected music data or displaying an image, an animation, or the like. In addition, at the time of the start of the sound separation process, the pattern previously stored in the storage unit 22 may be given to each filter of the sound processing unit 24 such that the user's listening to a song is smooth to his sense of hearing.

In step S12, it is checked whether or not the touch state continues. While the touch state continues, the above-described sound separation process may be continuously performed. If the touch is not sensed in step S12, it is determined that the touch is finished and the process progresses to step S13. In step S13, the sound separation process is finished and the process progresses to step S14. In step S14, the reproduction of the music data which is selected and reproduced by the long press of the user is finished. Next, in step S15, the independent reproduction of the original music data continues. Thereafter, the process returns to step S3. At the time of the end of the sound separation process, the pattern previously stored in the storage unit 22 may be given to each filter of the sound processing unit 24 such that the user's listening to a song is smooth to his sense of hearing.

The start-up of the sound separation process accompanied with the drag operation is basically equal to the sound separation process accompanied with the long press operation. In the drag operation, the drag display of the image is accompanied as an additional process.

As another operation, in step S9, if the touch is not sensed, without performing the switching (S16) of the reproduced music data, the process may progress to steps S10 and S11, in which the sound separation process continues for a predetermined time and the process progress to step S13. A plurality of songs may be selected in step S6.

Figure 26:
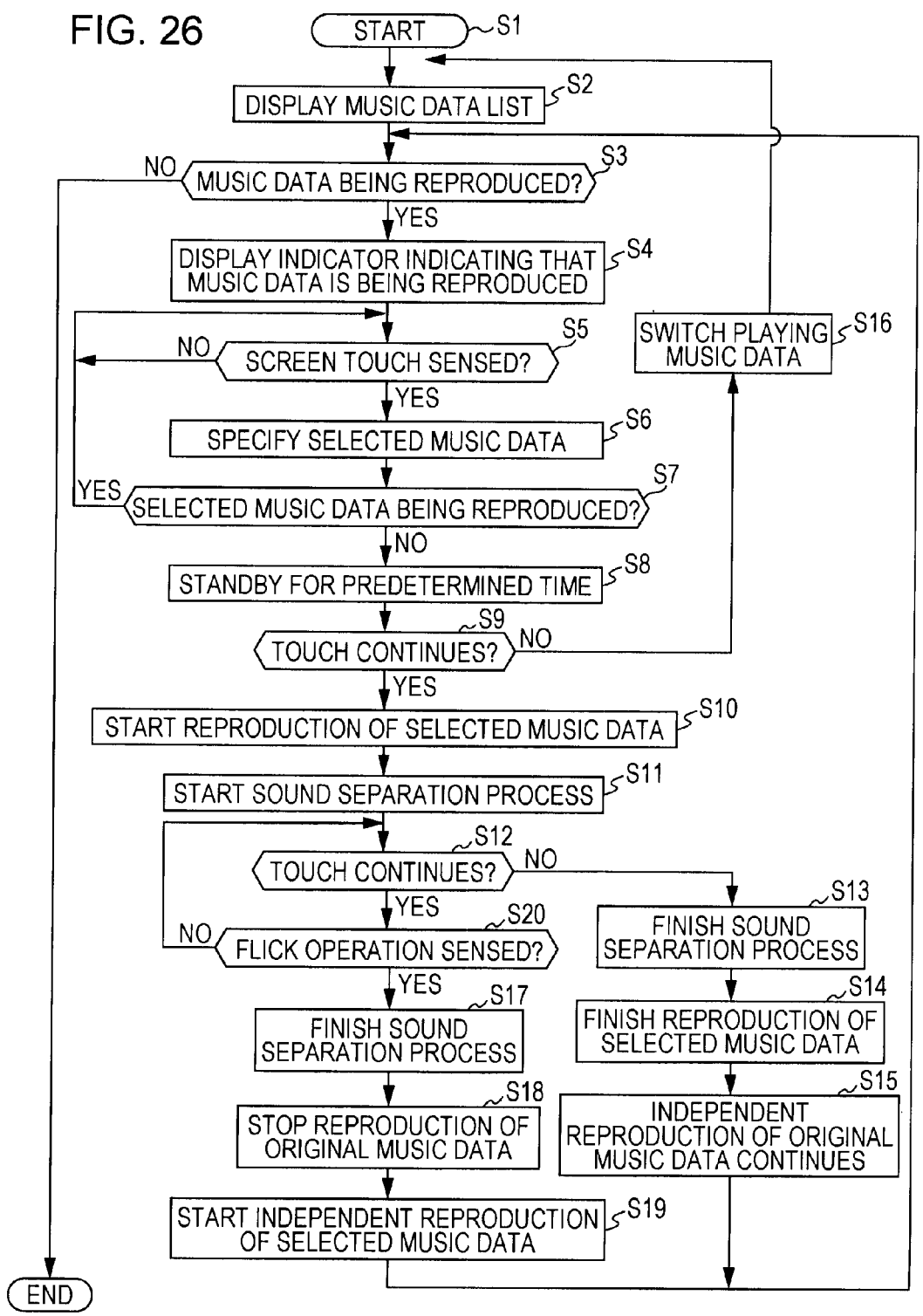
FIG. 26 is a flowchart illustrating a process of a sound processing device in a modified example of an embodiment of the present disclosure.

FIG. 26 is a flowchart illustrating a process of the sound processing device 16 in a modified example of the present embodiment. The same processing steps as FIG. 25 are denoted by the same reference numerals and the description thereof will be omitted.

If the above-described third operation (for example, flick) is detected (S20, Yes) while the touch continues in step S12, the sound separation process is finished (S17). In addition, the reproduction of the original music data which is originally being reproduced is stopped (S18) and the independent reproduction of the music data selected by the long press of the user is continuously performed (S19). In this case, as described above, the reproduction of the song may not be switched to the independent reproduction midway through the song but may be switched to the independent reproduction from the beginning. Subsequent to step S19, the process returns to step S3.

According to the above-described embodiment, the user easily listens to and compares another piece of sound data as a preview without stopping sound data which has been heard up to that time.

Although the suitable embodiments of the present disclosure are described, various modification and changes may be made in addition to the above description. That is, it is apparent to those skilled in the art that the above embodiments are exemplary and various modified examples of a combination of constituent components and processes may be made and such modified examples are in the scope of the present disclosure.

The selection of the music data may be assisted by displaying a cursor on the display unit 19 or changing the color of an area according to the kind of the input device. Even in an input device other than the touch panel, in addition to a cursor or the like, operations such as the touch, the long press, the flick or the drag may be performed using a key, a button or the like.

Although, in the present embodiment, a case where music content is heard is exemplified, the present disclosure is not limited thereto. For example, during telephone communication with a music data reproduction function unit, if a plurality of pieces of music data is desired to be selected while being heard, the above-described sound separation process may be performed with respect to the communication sound and the music data such that the music data is heard as a preview and selected even during the communication.

In addition, the present embodiment may be used in moving image content including sound data. For example, by a combination of the moving image reproduction and the method of the present disclosure, it is possible to efficiently listen to and select another moving image as a preview while a moving image is reproduced.

Although a touch panel is used as the user input unit 18, instead thereof or in addition thereto, for example, at least one input device such as a mouse, a keyboard, a trackball, a button, a joystick or a touch pen may be used.

Although the position of the virtual sound source is limited in the horizontal plane in the present embodiment, it may be set in a three-dimensional space centered on the head portion H.

A computer program for realizing the functions described in the above embodiments on a computer and a computer-readable storage medium for storing the program are included in the present disclosure. Examples of the "storage medium" for supplying the program include a magnetic storage medium (a flexible disk, a hard disk, a magnetic tape, or the like), an optical disc (a magneto-optical disk, a CD, a DVD, or the like), a semiconductor storage, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    circuitry configured to
        store a plurality of songs;
        control a display to display information corresponding to each of the plurality of songs;
        receive a first touch input selecting a first song of the plurality of songs;
        start reproduction of the first song in response to receiving the first touch input;
        receive a second touch input selecting a second song of the plurality of songs;
        determine that the second touch input is continuously received for a time period exceeding a predetermined threshold;
        simultaneously reproduce the first and second songs when it is determined the second touch input is continuously received for the time period exceeding the predetermined threshold;
        process the first and second simultaneously reproduced first and second songs to be separately audible by the user while the second touch input is continuously maintained;
        detect a flick operation corresponding to the second touch input; and
        stop reproduction of the first song in response to the flick operation while continuing reproduction of the second song.

2. The information processing apparatus of claim 1, wherein the display is a touch panel display configured to receive the first and second touch inputs.

3. The information processing apparatus of claim 1, wherein the circuitry is configured to control the display to display a character string as the information corresponding to each of the plurality of songs.

4. The information processing apparatus of claim 1, wherein the circuitry is configured to control the display to display a graphical image as the information corresponding to each of the plurality of songs.

5. The information processing apparatus of claim 1, wherein the circuitry is configured to convert the first and second songs into an analog signal.

6. The information processing apparatus of claim 5, wherein the circuitry is configured to amplify the analog signal.

7. The information processing apparatus of claim 1, wherein the circuitry is configured to control gain of the first and second songs to be uniform.

8. The information processing apparatus of claim 1, wherein the circuitry is configured to perform a frequency band division process on the first and second songs.

9. The information processing apparatus of claim 8, wherein the circuitry is configured to divide an audible frequency band into a plurality of frequency bands and exclusively assign each one of the plurality of frequency bands to one of the first or second songs.

10. The information processing apparatus of claim 1, wherein the circuitry is configured to perform a time division process on the first and second songs.

11. The information processing apparatus of claim 10, wherein the circuitry is configured to modulate an amplitude of each of the first and second songs such that time points at which the amplitude modulated first song are maximized overlap with time points at which the amplitude modulated second song are minimized.

12. The information processing apparatus of claim 1, wherein the circuitry is configured to apply a predetermined processing effect to at least one of the first and second songs.

13. The information processing apparatus of claim 1, wherein the circuitry is configured to process the first and second songs to differentiate a perceived direction of a sound source corresponding each of the first and second songs.

14. An information processing method performed by an information processing apparatus, the method comprising:
    storing a plurality of songs;
    displaying, at an interface of the information processing apparatus, information corresponding to each of the plurality of songs;
    receiving, at the interface, a first touch input selecting a first song of the plurality of songs;
    starting reproduction of the first song in response to receiving the first touch input;
    receiving, at the interface, a second touch input selecting a second song of the plurality of songs;
    determining that the second touch input is continuously received for a time period exceeding a predetermined threshold;
    initiating simultaneous reproduction of the first and second songs when it is determined that the second touch input is continuously received for the time period exceeding the predetermined threshold;
    processing the simultaneously reproduced first and second songs to be separately audible by the user while the second touch input is continuously maintained;
    detecting, at the interface, a flick operation corresponding to the second touch input; and
    stopping reproduction of the first song in response to the flick operation while continuing reproduction of the second song.

15. The information processing method of claim 14, wherein the interface is a touch panel display that is configured to receive the first and second touch inputs.

16. The information processing method of claim 14, wherein the displaying includes displaying a character string or a graphical image as the information corresponding to each of the plurality of songs.

17. A non-transitory computer-readable medium including computer program instructions, which when executed by an information processing apparatus, cause the information processing apparatus to perform a method comprising:
    storing a plurality of songs;
    displaying information corresponding to each of the plurality of songs;
    receiving a first touch input selecting a first song of the plurality of songs;
    starting reproduction of the first song in response to receiving the first touch input;
    receiving a second touch input selecting a second song of the plurality of songs;

determining that the second touch input is continuously received for a time period exceeding a predetermined threshold;
initiating simultaneous reproduction of the first and second songs when it is determined that the second touch input is continuously received for the time period exceeding the predetermined threshold;
processing the simultaneously reproduced first and second songs to be separately audible by the user while the second touch input is continuously maintained;
detecting, at the interface, a flick operation corresponding to the second touch input; and
stopping reproduction of the first song in response to the flick operation while continuing reproduction of the second song.

* * * * *